US010431012B2

United States Patent
Banatwala et al.

(10) Patent No.: US 10,431,012 B2
(45) Date of Patent: *Oct. 1, 2019

(54) DYNAMICALLY MANAGING PARKING SPACE UTILIZATION

(71) Applicant: INTERNATIONAL BUSINESS MACHINES CORPORATION, Armonk, NY (US)

(72) Inventors: Mustansir Banatwala, Hudson, NH (US); David A. Brooks, Arlington, MA (US); Joseph A. Russo, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/199,088

(22) Filed: Nov. 23, 2018

(65) Prior Publication Data

US 2019/0096141 A1 Mar. 28, 2019

Related U.S. Application Data

(63) Continuation of application No. 14/839,890, filed on Aug. 28, 2015, and a continuation of application No.
(Continued)

(51) Int. Cl.
*G07B 15/02* (2011.01)
*G06Q 10/00* (2012.01)
(Continued)

(52) U.S. Cl.
CPC .............. *G07B 15/02* (2013.01); *G06Q 10/00* (2013.01); *G08G 1/017* (2013.01); *G08G 1/0175* (2013.01);
(Continued)

(58) Field of Classification Search
CPC ....................................................... G08G 1/14
See application file for complete search history.

(56) References Cited

U.S. PATENT DOCUMENTS 7,893,847 B2 * 2/2011 Shanbhag ................ G08G 1/14
340/435
7,941,337 B2 5/2011 Vitrano, Jr. et al.
(Continued)

FOREIGN PATENT DOCUMENTS

EP 2444924 A1 4/2012
WO 2013006549 A2 1/2013

OTHER PUBLICATIONS

"List of IBM Patents or Patent Applications Treated as Related", including U.S. Appl. No. 14/572,188 and U.S. Pat. No. 9,530,253, filed Dec. 16, 2014, entitled "Dynamically Managing Parking Space Utilization"; and U.S. Appl. No. 14/839,890, filed Aug. 28, 2015, entitled "Dynamically Managing Parking Space Utilization".

*Primary Examiner* — Emily C Terrell
*Assistant Examiner* — Pameshanand Mahase
(74) *Attorney, Agent, or Firm* — Daniel R. Simek

(57) ABSTRACT

A method for dynamically managing parking space utilization including receiving a dynamic feed of available parking spaces across a set of sectors, each parking space associated with a parking control device, each sector having a preferred utilization rate; utilizing a processor to determine that a parking utilization rate of a first sector exceeds a preferred utilization rate for the first sector; upon receiving a location based parking space reservation request from a user, the request capable of being fulfilled from a plurality of sectors, providing a list of available parking spaces meeting the request including associated prices dynamically generated, wherein parking spaces in the first sector are priced higher than parking spaces in other sectors; and upon selection of one of the provided list of available parking spaces by the
(Continued)

user, allocating the selected parking space to the user at the provided associated price and notifying the parking control device associated with the selected parking space.

16 Claims, 17 Drawing Sheets

Related U.S. Application Data

14/572,188, filed on Dec. 16, 2014, now Pat. No. 9,530,253.

(51) Int. Cl.
  *G08G 1/017* (2006.01)
  *G08G 1/14* (2006.01)
(52) U.S. Cl.
  CPC .............. *G08G 1/14* (2013.01); *G08G 1/143* (2013.01); *G08G 1/144* (2013.01); *G08G 1/146* (2013.01); *G08G 1/147* (2013.01); *G08G 1/148* (2013.01); *G08G 1/149* (2013.01)

(56) References Cited

U.S. PATENT DOCUMENTS

| | | |
|---|---|---|
| 2003/0144890 A1 | 7/2003 | Dan |
| 2004/0252034 A1* | 12/2004 | Slemmer .................. G08G 1/14 340/932.2 |
| 2005/0280555 A1 | 12/2005 | Warner, IV |
| 2009/0164383 A1* | 6/2009 | Rothman ........... G06Q 30/0206 705/80 |
| 2010/0156670 A1 | 6/2010 | Hamilton |
| 2010/0302068 A1 | 12/2010 | Bandukwala |
| 2011/0022427 A1 | 1/2011 | Dayan |
| 2013/0006736 A1 | 1/2013 | Bethke |
| 2014/0089015 A1* | 3/2014 | Stefik ..................... G06Q 10/08 705/5 |
| 2014/0032282 A1 | 6/2014 | Fu |
| 2014/0358596 A1* | 12/2014 | Brown .................. G06Q 50/30 705/5 |

\* cited by examiner

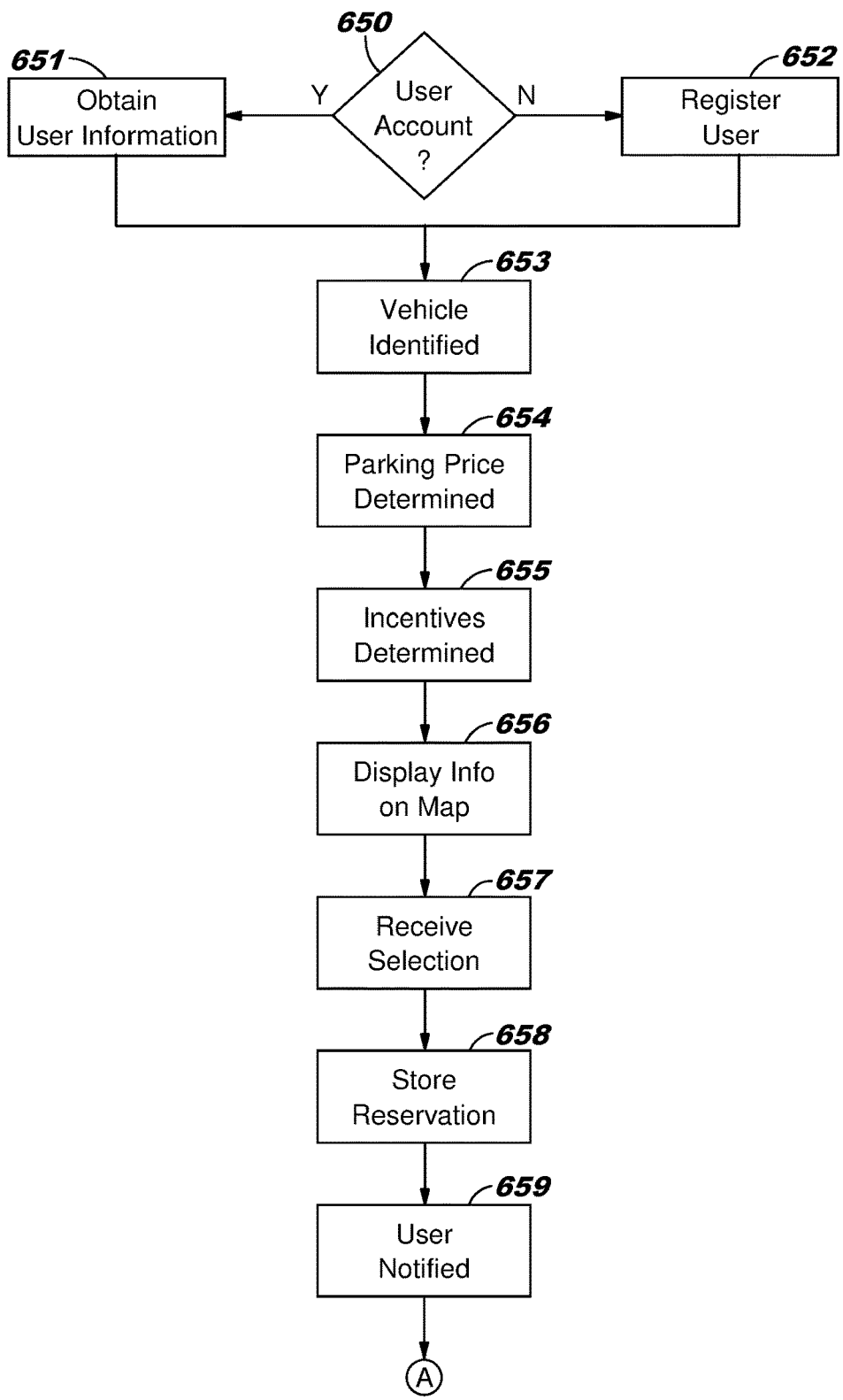

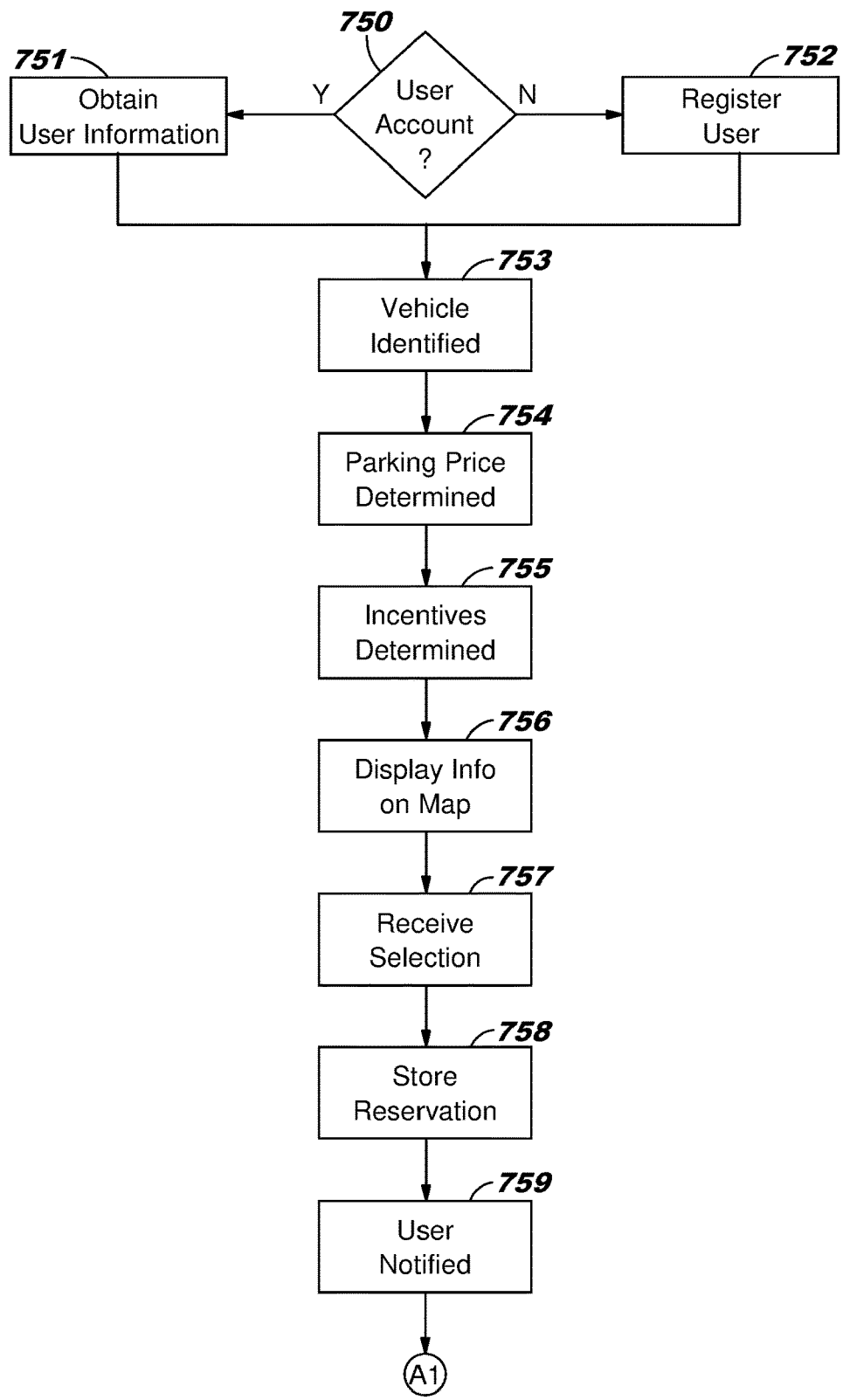

FIG. 9

Location? : 3110 5th Avenue — 900, 904

902

31st Street

910

925

XYZ Corp

5th Ave

920

32nd Street

1. Select all Parking Spaces for Incentive
2. Select Incentive:   ☐ Reduce fee by $
   ☒ Provide Sale discount 10%
   906
   ☐ Other

Location     *1010*

- ☒ Zone(s) _A, B_____
- ☐ Sub-Zone(s) _____
- ☐ Parking Space(s) _____
- ☐ Parking Space Type(s)_____

Time     *1020*

- ☐ 24/7/365
- ☐ 24/7 except _____ date(s)
- ☐ Daily 8am to 5pm
- ☒ Rush Hours 7-10am and 4-7pm
- ☐ Hours ___ to ___ every day
- ☐ Date _/_/_ Hours ___ to ___

Set     *1030*

- ☐ Minimum fee $ ___ / hour
- ☐ Maximum fee $ ___ / hour
- ☒ Avg. Utilization Rate Z %
- ☐ _____

1040

Rule: Z = 100 - ( 100 - TRAFFIC_VOLUME)/5

Criteria: "if TRAFFIC_VOLUME > 60%"

DYNAMICALLY MANAGING PARKING SPACE UTILIZATION

This application is a continuation of application Ser. No. 14/839,890 filed Aug. 28, 2015 entitled "DYNAMICALLY MANAGING PARKING SPACE UTILIZATION which is a continuation of application Ser. No. 14/572,188 filed Dec. 16, 2014 entitled "DYNAMICALLY MANAGING PARKING SPACE UTILIZATION", the disclosures of which are incorporated in their entirety herein by reference.

BACKGROUND

1. Technical Field

The present invention relates generally to dynamically managing parking space utilization, and in particular, to a computer implemented method for dynamically allocating parking space utilization based on multiple factors.

2. Description of Related Art

Cities, airports, and other governmental and private companies use a variety of techniques to manage parking. These techniques often are utilized to reduce the time needed for a person to find a parking spot and to increase utilization of the parking facilities. For example, some airports and cities may indicate which parking lots or facilities are full and which parking lots have parking spaces available. This reduces the amount of time that drivers spend looking for parking spaces, thereby saving time and fuel. Such systems require monitoring of parking availability and occupancy through a variety of means including manually observing and entering such information, by using parking control devices that count the number of vehicles entering and leaving a parking facility, or by using other automated methods.

SUMMARY

The illustrative embodiments provide a method for dynamically managing parking space utilization including receiving a dynamic feed of available parking spaces across a set of sectors, each parking space associated with a parking control device, each sector having a preferred utilization rate; utilizing a processor to determine that a parking utilization rate of a first sector exceeds a preferred utilization rate for the first sector; upon receiving a location based parking space reservation request from a user, the request capable of being fulfilled from a plurality of sectors, providing a list of available parking spaces meeting the request including associated prices dynamically generated, wherein parking spaces in the first sector are priced higher than parking spaces in other sectors; and upon selection of one of the provided list of available parking spaces by the user, allocating the selected parking space to the user at the provided associated price and notifying the parking control device associated with the selected parking space.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIGS. 6A-D are flow diagrams of a parking pricing system in accordance with a first embodiment;

FIGS. 7A-F are a flow diagrams of a parking pricing system in accordance with a second embodiment;

FIG. 9 is a pictorial diagram of a business user interface in which various embodiments may be implemented; and FIG. 10 is a pictorial diagram of an administrator user interface in which various embodiments may be implemented.

DETAILED DESCRIPTION

Processes and devices may be implemented and utilized for dynamically managing parking space utilization. These processes and apparatuses may be implemented and utilized as will be explained with reference to the various embodiments below.

Figure 1:
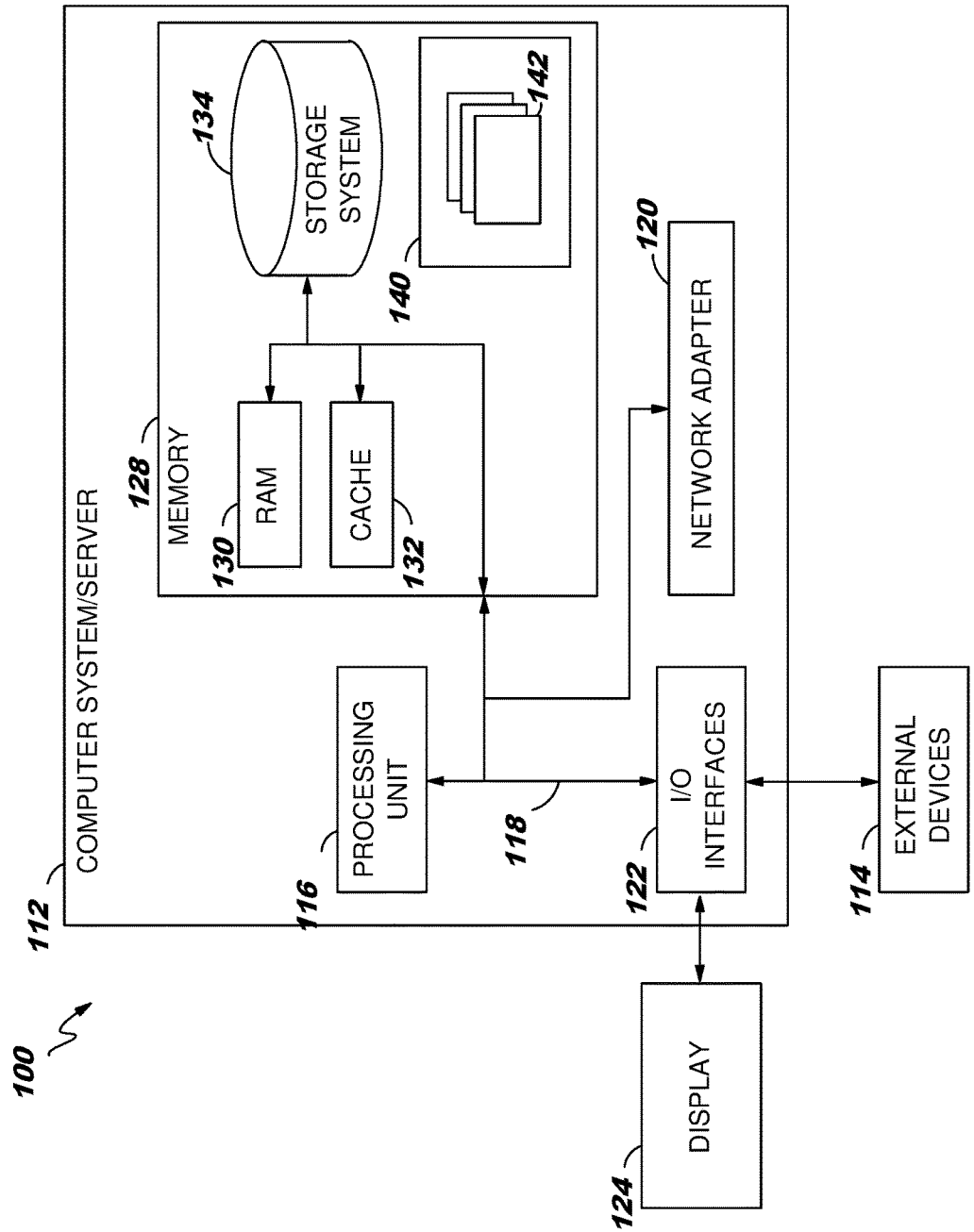
FIG. 1 is a block diagram of an illustrative data processing system in which various embodiments of the present disclosure may be implemented.

FIG. 1 is a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as dynamically managing parking space utilization.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system readable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for dynamically managing parking space utilization.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
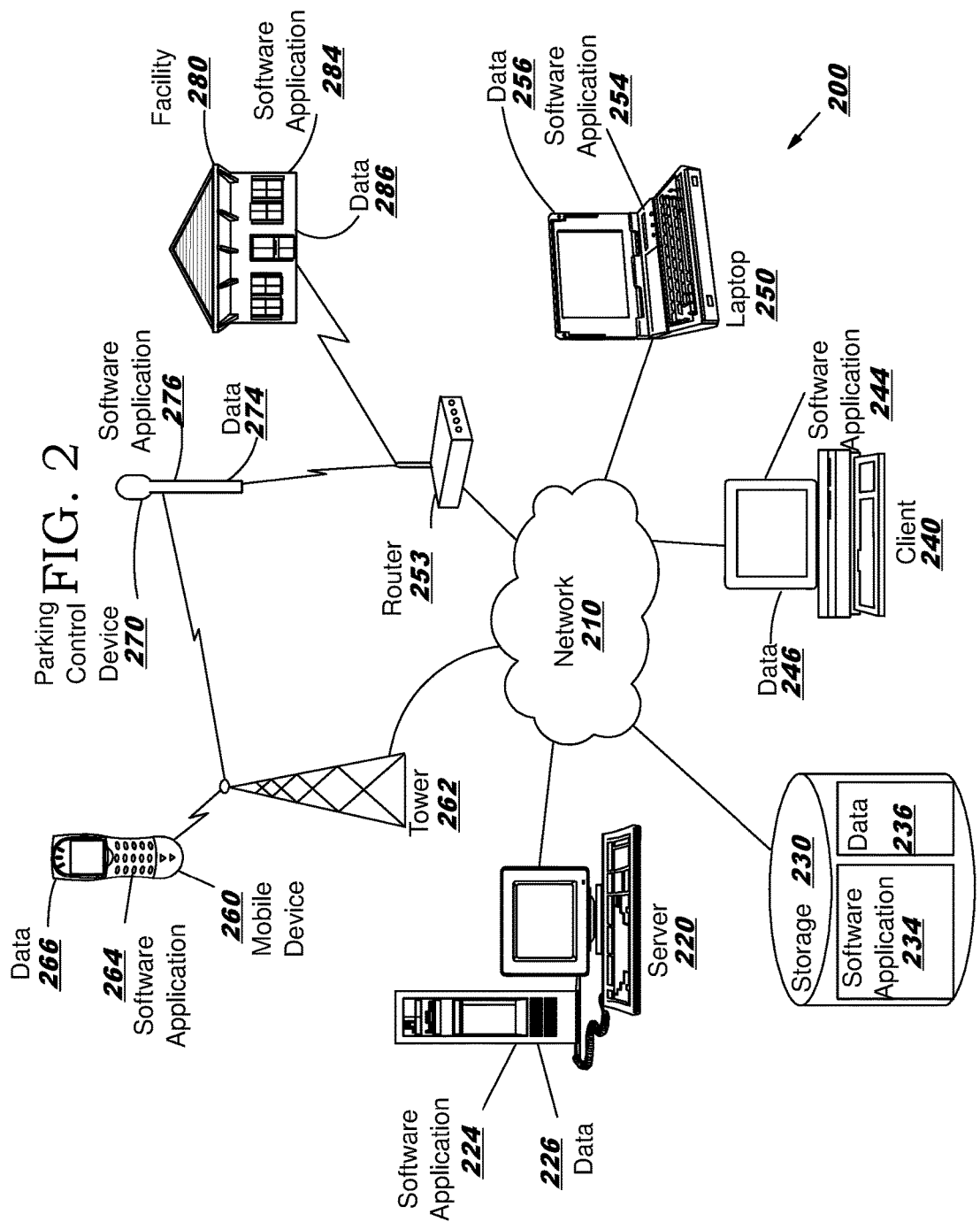
FIG. 2 is a block diagram of an illustrative network of data processing systems in which various embodiments of the present disclosure may be implemented.

FIG. 2 is a block diagram of an illustrative network of data processing systems in which various embodiments of the present disclosure may be implemented. Data processing environment 200 is a network of data processing systems such as described above with reference to FIG. 1. Software applications such as for dynamically managing parking space utilization may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250, parking control device 270 and facility 280 (such as a home or business) are coupled to network 210 including wirelessly such as through a network router 253. A mobile phone 260 and parking control device may be coupled to network 210 through a mobile phone tower 262. Data processing systems, such as server 220, client 240, laptop 250, mobile phone 260, parking control device 270 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for dynamically managing parking space utilization or other software applications and data in accordance with embodiments described herein. Storage 230 may contain software application 234 and a content source such as data 236 for dynamically managing parking space utilization. Other software and content may be stored on storage 230 for sharing among various computer or other data processing devices. Client 240 may include software application 244 and data 246. Laptop 250, mobile phone 260 and parking control device 270 may also include software applications 254, 264 and 276 as well as data 256, 266 and 274. Facility 280 may include software applications 284 and data 286. Other types of data processing systems coupled to network 210 may also include software applications. Software applications could include a web browser, email, or other software application for dynamically managing parking space utilization.

Server 220, storage unit 230, client 240, laptop 250, mobile phone 260, parking control device 270 and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260, parking control device 270 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3A:
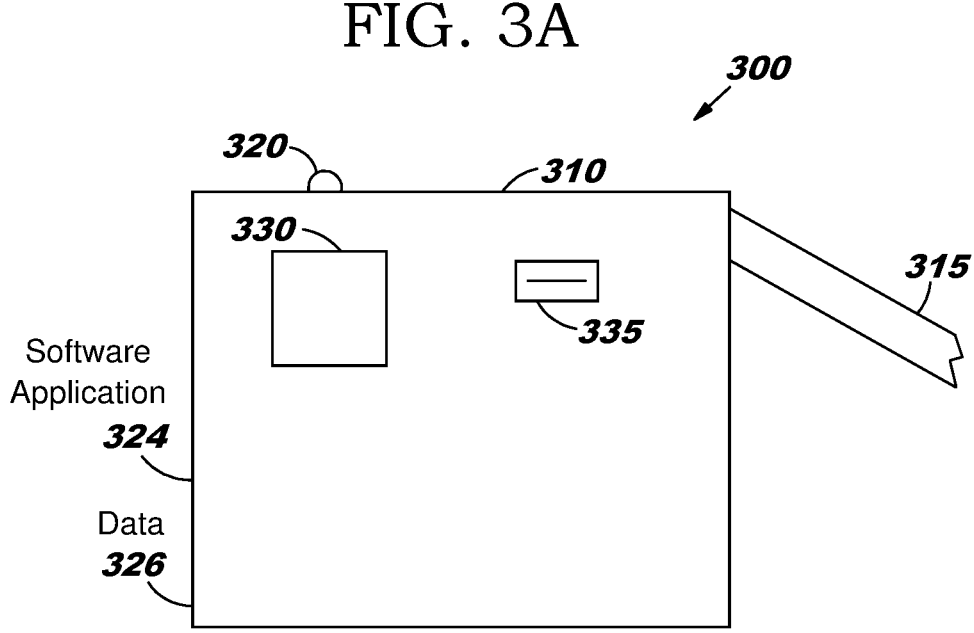
FIGS. 3A and 3B are parking control devices in which various embodiments may be implemented.
Figure 3B:
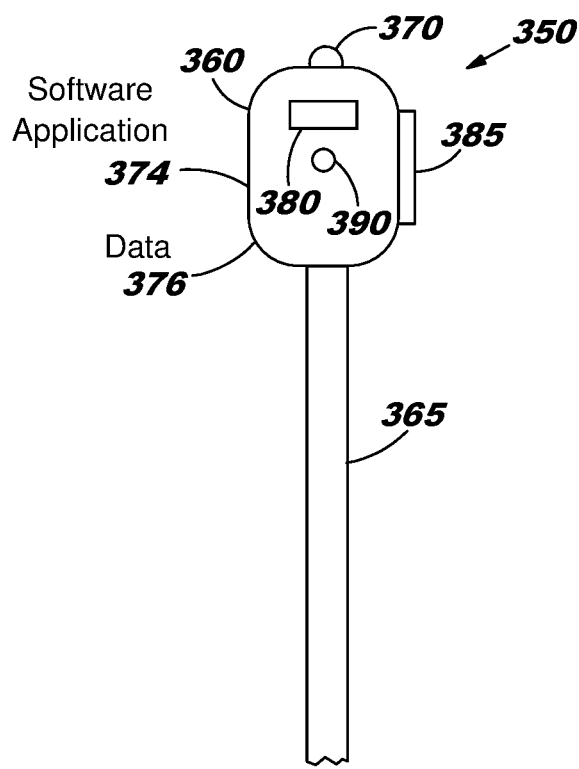

FIGS. 3A and 3B are parking control devices in which various embodiments may be implemented. Many types of parking control devices may be utilized including those shown herein for managing the utilization of one or more parking spaces by users. Such parking control devices may interface with a parking management system to provide parking spaces for selected users or otherwise implement management of parking space utilization.

FIG. 3A illustrates a parking lot control device 300 which manages the entry and/or exit of vehicles to a parking lot. Parking lot control device 300 includes a main body 310 and a cross arm 315. Cross arm 315 prevents the entry of vehicles and is raised and lowered by main body 310. Main body 310 includes a wireless communication device 320 for interacting with a central or other parking management system or with a mobile or other device of a person attempting to park in the parking lot. Alternatively, the parking control device could communicate with a central or other parking management system through a cable or other landline wiring. Also included in parking lot control device 300 are a software application 324 and data 326 which are stored in memory and utilized by a processing circuit for managing the operation of the control device. This includes communicating with a central parking management system utilizing wireless communication device 320. Parking control device 300 also includes a user interface 330 for interacting visually with parking customers. User interface 330 can be a touch screen liquid crystal device (LCD) or a display screen with buttons for a user to press for interaction. Many of types of user interfaces could be utilized. Parking control device 300 also includes a payment slot 335 where a user can pay for parking by inserting a credit card. Alternatively, a wireless pad or other type of device such as a mobile phone may be utilized to allow the user to pay for parking by touching or waving the device over the wireless pad to establish near field communications. Parking control device may also distribute a parking ticket to the user with a timestamp for calculating parking payment when the user leaves the parking lot. Many other types of devices and capabilities may be included. For example, parking lot control device 300 may include or be coupled with a video system for identifying vehicles by their license plate. In addition, parking lot control device may be coupled with a separate parking ticket payment device where the user pays for the time of parking prior to exiting the parking lot.

FIG. 3B illustrates a parking space control device 350 which manages a single or multiple contiguous parking spaces. Parking space control device 350 includes a main body 360 and a support 365. Main body 360 includes a wireless communication device 370 for interacting with a central or other parking management system or with a mobile or other device of a person attempting to park in the parking lot. Alternatively, the parking control device could communicate with a central or other parking management system through a cable or other landline wiring. Also included in parking space control device 350 are a software application 374 and data 376 which are stored in memory and utilized by a processing circuit for managing the operation of the control device. This includes communicating with a central parking management system utilizing wireless communication device 370. Parking control device 350 also includes a user interface 380 for interacting visually with parking customers. User interface 380 can be a touch screen liquid crystal device (LCD) or a display screen with buttons for a user to press for interaction or simply a display device. Many of types of user interfaces could be utilized. The user interface could be for communicating visually with a person parking their vehicle or a person looking for a parking space. For example, a "RESERVED" signal may be flashed or otherwise presented to prevent an unauthorized user from parking in a parking space already allocated to an incoming customer. Parking space control device 350 also includes a payment attachment 385 where a user can pay for parking by sliding a credit card. Alternatively, a wireless pad or other type of device such as a mobile phone may be utilized to allow the user to pay for parking by touching or waving the device over the wireless pad to establish near field communications. Parking space control device may also distribute a parking ticket to the user with a timestamp for calculating parking payment when the user leaves the parking space. Parking space control device 350 can include an electric eye 390 or other type of sensor to determine whether the parking space is occupied or not. Many other types of devices and capabilities may be included. For example, parking space control device 350 may include or be coupled with a video system for identifying vehicles by their license plate. In addition, parking space control device 350 may be coupled with a separate parking ticket payment device where the user pays for the time of parking prior to exiting the parking space.

Figure 4:
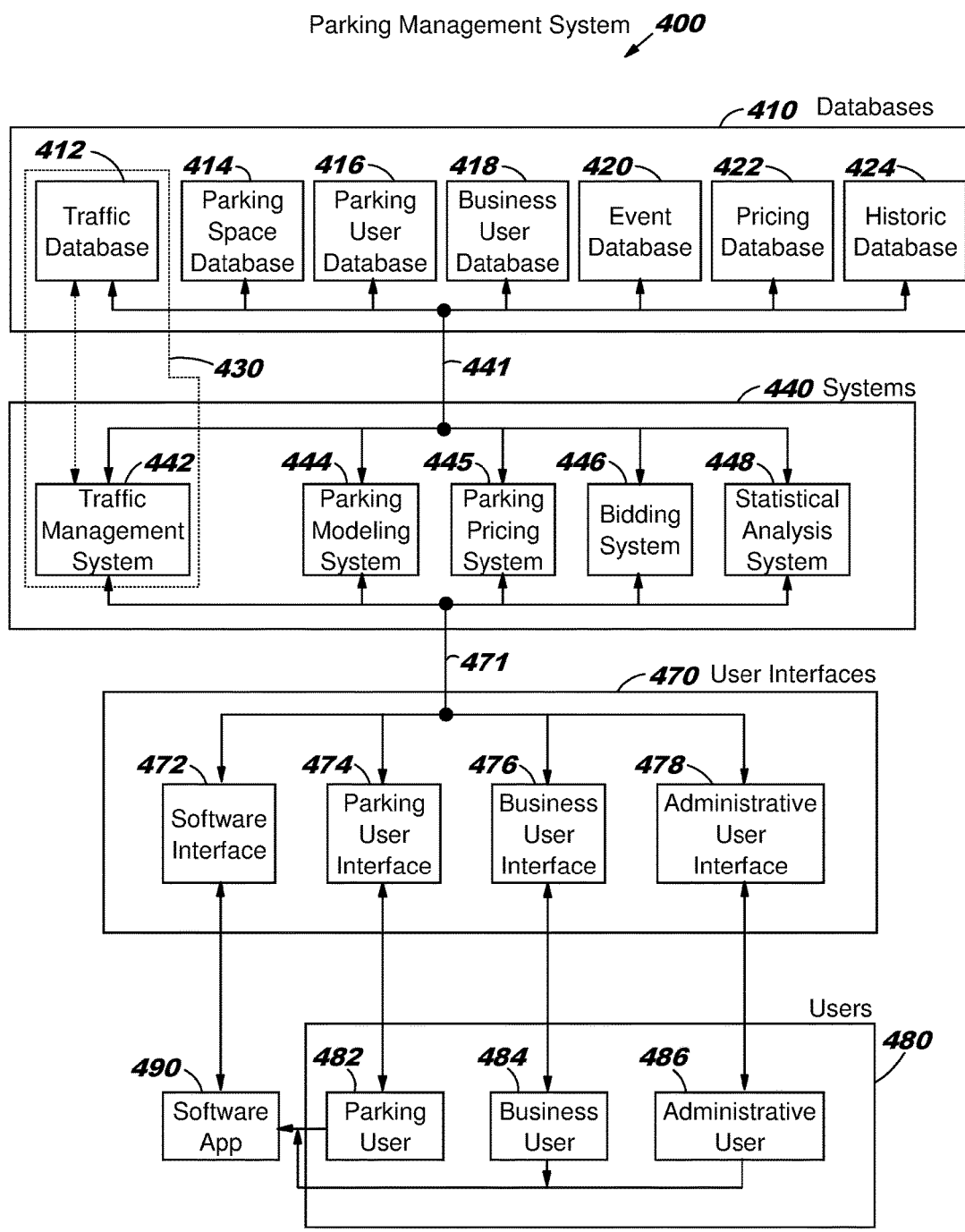
FIG. 4 is a block diagram of a parking management system in which various embodiments may be implemented.

FIG. 4 is a block diagram of a parking management system 400 in which various embodiments may be implemented. Parking management system 400 manages the allocation and pricing of parking spaces across a parking management area. A parking management area may be city or metropolis wide, a portion of a city, or a limited parking area shared by one or more private or public entities. Parking management system 400 includes a set of databases 410 utilized by systems 440 that interact through user interfaces 470 with users 480 and software app 490. Operation of parking management system 400 is described below.

Databases 410 include traffic database 412, parking space database 414, parking user database 416, business user database 418, event database 420, pricing database 422 and historical database 424. Traffic database 412 is a database including a variety of traffic information which may be utilized in managing parking. Such information can include current or predicted traffic flow or utilized road capacity. For example, if traffic flow is particularly heavy for a certain part of town, parking prices may be increased for that part of town to decrease traffic flow to that part of town. This can be based on current traffic flow or predicted traffic flow. This traffic flow can be provided as a traffic feed upon request or as a continuous feed of traffic flow information. Parking space database 414 includes a listing of all parking spaces available including their location, when the parking spaces are reserved or otherwise occupied, and any attributes of each space. For example, a parking space may be located in a specific parking lot, may be for disabled persons, may be a parallel parking space, etc. A reference to the parking control device that manages that parking space can also be included.

Parking user database 416 includes information about parking users that utilize parking management system 400 for obtaining a parking space for their vehicle. This information can include user preferences such as whether the user prefers no parallel parking, user credit card information for paying for parking, an account balance of prepaid parking by the user, etc. Business user database 418 includes information about business users that utilize parking management system 400 for subsidizing parking for selected parking users. For example, a business may pay or subsidize parking spaces for their employees or customers and/or provide discounts for customers on goods and services. Information could include business location, types of spaces (e.g., disabled), location of spaces (e.g., a certain parking lot or street location), account information for invoicing the business user, etc.

Event database 420 includes information regarding upcoming public and private events such as concerts, sports events, etc. This can include time, location and expected attendance information which can be utilized to allocate appropriate parking spaces for the events as well as parking event pricing. This information can also be utilized to manage traffic flow including pricing of parking elsewhere to reduce traffic flow and demand for parking in the area of the event prior and during the event. Parking for businesses may be considered a daily event. That is, employees parking near their place of business may be considered an event for purposes of planning for traffic flow and parking space utilization.

Pricing database 422 can include a variety of pricing information including standard prices for parking by location and time of day and week, minimum prices even when trying to increase demand in a certain area, maximum prices to avoid price gouging accusations, as well as certain bidding constraints when bidding is utilized for allocating parking spaces. For example, bidding for a parking space may occur when demand for parking spaces in a certain area exceeds a certain minimum. Historical database 424 includes a variety of historical information useful for allocating parking. This can include prior demand and pricing information for parking spaces by location, the effect of events on parking, whether certain parking users or business users may be interested in parking or parking subsidy offers, etc.

Systems 440 include certain systems which can be utilized for managing parking and which utilize databases 410 across communication line 441. This includes traffic management system 442, parking modeling system 444, parking pricing system 445, bidding system 446 and statistical analysis system 448. Traffic management system 442 manages traffic by observing traffic patterns, identifying traffic incidents and other traffic constraints, and managing traffic flow utilizing a variety of techniques including providing traffic flow needs as traffic feed to parking modeling system 444 and parking pricing system 445. Traffic management system 442 and traffic database 412 may be tightly coupled into parking management system 400 or may be a separate system 430 that interfaces with parking management system 400.

Parking modeling system 444 generates supply and demand pricing models for parking in different parts of the parking management area based on current and predicted traffic feed from traffic management system 442, from historical database 424, and from statistical analysis system 448. Pricing variations can be due to traffic flow, user demand, business subsidies, events, administrative requirements, etc. Parking pricing system 445 can then determine the pricing of parking throughout parking spaces under its control based on current supply and demand given the parking supply and demand pricing models generated by parking modeling system 444. The operation of parking modeling system 444 and parking pricing system 445 is described below. Bidding system 446 is a system for managing the auction or other method of allowing users to bid for parking spaces. Bidding system 446 may be separate from and invoked by parking pricing system, or it may be integrated into parking pricing system 445. Statistical analysis system 448 is utilized for performing statistical analysis on historical and other data for use by the other systems described herein.

Systems 440 also interact with various types of users 480 through user interfaces 470 across communication line 471. User interfaces 470 include a software interface 472 for interfacing with a variety of user software such as mobile software applications or even vehicle applications. For example, a user may utilize a software application on a mobile device or a map software application running on a vehicle to communicate with systems 440 for obtaining parking space. This provides a standard interface for user software to communicate with systems 440. Parking user interface 474 is a standard interface utilized by parking users such as across the internet for obtaining a parking space. For example, a user may use an internet browser at home or one a mobile device to reserve a parking space in the near future at a desirable location. Business user interface 476 is a standard interface utilized by business users to manage parking subsidies or other incentives for employees or customers to park near their business. Administrative user interface 478 is a standard interface utilized by administrative users to manage the various parameters utilized by systems 440. For example, administrative users may establish certain minimums and maximum parking prices, provide information about upcoming public or private events, etc.

Users 480 include a variety of users that can utilize or manage parking management system 400. This includes parking users 482 requesting parking spaces, business users 484 creating parking subsidies or incentives for their customers, and administrative users 486 for managing parking management system 400. Software app 490 can be any sort of software application which can act as a type of user interface or tool for a parking user, a business user, or even an administrative user. Software app 490 can be on a mobile device, a vehicle mapping system, a global positioning system (GPS) device, etc.

Figure 5:
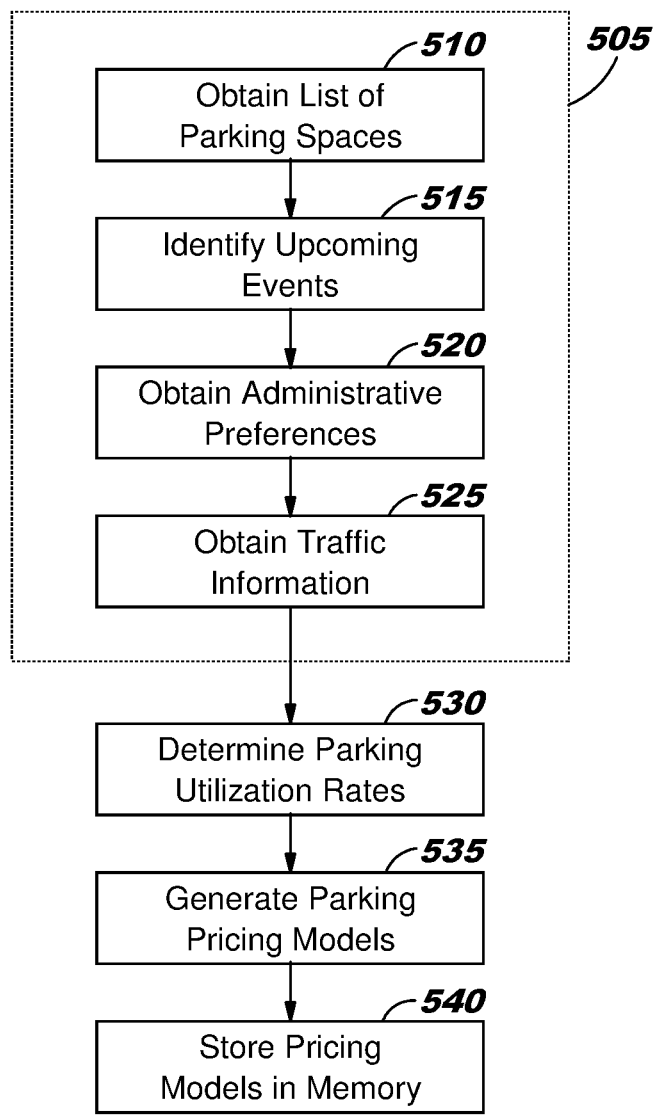
FIG. 5 is a flow diagram of a parking modeling system in which various embodiments may be implemented.

FIG. 5 is a flow diagram of a parking modeling system in which various embodiments may be implemented. In this process, the parking modeling system generates or updates a variety of parking pricing models to be utilized by the parking pricing system as described below. That is, the parking modeling system provides a set of parking supply and demand pricing models across the parking management area, such as by zones, subzones or other sectors, which are then utilized for pricing parking spaces as users request parking spaces. A metropolitan area or city can manage parking and traffic using these processes to promote even or optimal usage of transportation and parking resources. These processes are for managing parking and traffic resource utilization, which can be implemented utilizing parking space pricing as described here. As described above, a parking management area may be city or metropolis wide, a portion of a city, or a limited parking area shared by one or more private or public entities.

The parking modeling system first obtains or derives needed information for generating preferred utilization rates for parking and the resulting parking pricing models from a variety of sources in steps 510-525 as indicated by dashed box 505. Step 510 includes obtaining a listing of all parking spaces or groups of parking spaces (e.g., a parking lot with access managed by a parking lot control device) including current usage and upcoming reservations from parking space database 414. These parking spaces may have been previously grouped into zones and subzones or other location or regional measure, hereinafter referred to generally as sectors. In step 515, upcoming events are identified from event database 420. This can include public or private events which could affect traffic and parking. For example, a football game in a certain part of the parking management area will require extensive parking as well as affect traffic in the area. In step 520, administrative pricing and other preferences are obtained from pricing database 422 in step 520. This can include minimum and maximum prices, hours that parking fees are assessed, preferred utilization rates or other utilization preferences, revenue targets, preset prices for reserved parking more than a preset period of time in advance, etc. Then in step 525, any relevant traffic information or traffic flow is obtained from traffic database 412 as traffic feed such as current traffic patterns and any unusual events which can affect parking such as accidents or road construction. Future traffic flow projections based on historical traffic flow patterns, future events, and business user incentives may be included as a component of the traffic feed, which can affect parking space pricing currently and in the future. Other information useful for generating preferred parking utilization rates and resulting parking pricing models may also be obtained at this time. As a result, preferred parking rates and the resulting parking pricing models are based on a variety of factors including traffic flow with (into or out of) a sector, upcoming or current events which can affect traffic flow, business user incentives, as well as other considerations including administrative user constraints and revenue generation requirements. Processing then proceeds to step 530.

From this information, in step 530 preferred (or desired) utilization rates for parking are determined by zone, subzone or other sector within the parking management area. For example, typically a high amount of parking utilization is preferred during normal business hours such as 98% (which may be a preset amount based on administrative preferences). However, this preferred utilization rate may be affected for selected areas by events, traffic flow, and other factors. For example, a certain amount of parking spaces may be needed for a particular event. As a result a lower preferred utilization rate of utilization may be needed just prior to that event. A percentage range may also be generated indicating the desired range of parking utilization. For example, a preferred utilization rate may be 65% for a given zone with a range of 50% to 80% in anticipation of an upcoming event.

Then in step 535, parking supply and demand pricing models are generated by zone, subzone or other sector. This is determined by utilizing statistical analysis system and using historical information from the historic database 424 and the preferred utilization rates which can include a percentage and range. This statistical analysis can be managed by an administrative user through rules and criteria. For example, a rule can be provided to provide a given number of empty parking spaces in a particular sub-zone preceding a type of public event such as a basketball game. That is, to reduce the amount of parking in a given area (e.g., when the actual parking utilization rate exceeds the preferred utilization rate), the supply and demand pricing model may be set for a higher price. A rule provided by an administrative user can set the general parameters and then criteria are utilized to provide the specific parameters. For example, if ongoing demand for parking in an area with a preferred 50% utilization rate (plus or minus 10%) is historically low, parking prices may be set for 10 currency units per hour, and if demand increases, prices may quickly rise to 30 currency units per hour for that area. However, if ongoing demand for parking in an area with a preferred 98% utilization rate is historically low, parking prices may be set at 2 currency units per hour, and if demand increases, prices may be rise to 5 currency units per hour for that area. As a result, when the parking utilization rate exceeds the preferred utilization rate for a given sector, the price for parking spaces in the given sector are priced higher than parking spaces in other sectors that do not have their parking utilization rate exceeding their preferred utilization rate. In both of these cases, the prices are a straight line supply and demand model ($Y=mX+b$ where X is demand and Y is price) with the first model starting at a higher price and with a higher slope and the second model starting at a lower price with a lower slope. Other types of models may be utilized including non-linear equations (e.g., $Y=aX^2+bX+c$), fixed pricing ($Y=X$) including free parking ($Y=0$), or no parking ($Y=\infty$). The type of equation utilized may be based on administrative preferences, on a statistical least squares fit, or on other deciding factors. Ranges may be included with these pricing models to indicate when the pricing model may need to be updated. These models may be by zone, subzone and/or other sector, by distance from a given point, by a combination thereof to avoid discontinuities in pricing, or other location measures. However, depending on the type of grouping utilized, two nearby parking spots in different zones may have very different prices. Various types of statistical or location based smoothing techniques such as weighted averages may be utilized to avoid these types of large variations.

These parking supply and demand pricing models may also have a time component. That is, pricing models may also be developed for future time periods. This can be accomplished by the use of multiple pricing models, each model being specific for a given time period, or a time variable or other component may be included to modify the pricing model over time. Both approaches may be utilized.

For example, a time variable may be utilized for the next 24 hours with a more general pricing model utilized for parking more than 24 hours in advance. For example, the time variable may be a set of hourly adjustments for the next 24 hours and a set of fixed prices may be utilized for parking reservation more than 24 hours in advance. The types of models utilized can be managed by an administrative user through the administrative user database.

Once these parking pricing models have been developed, then in step 540 they can be stored in the pricing database for use by the parking pricing system. The pricing models can be updated on a regular basis, perhaps hourly, or whenever a new event occurs that could necessitate adjusting the pricing models. This could include events where the parking pricing system determines that certain zones or sectors have excessively high or low parking utilization rates compared to the preferred utilization rate for those zones or sectors.

FIGS. 6A-D are flow diagrams of a parking pricing system in accordance with a first embodiment. This system works dynamically on an incremental/on-demand basis managing the allocation of and prices for parking spaces by utilizing the parking supply and demand pricing models generated by the parking management system. This system can also invoke the parking management system as needed to adjust or update the parking pricing models as needed.

Figure 6A:
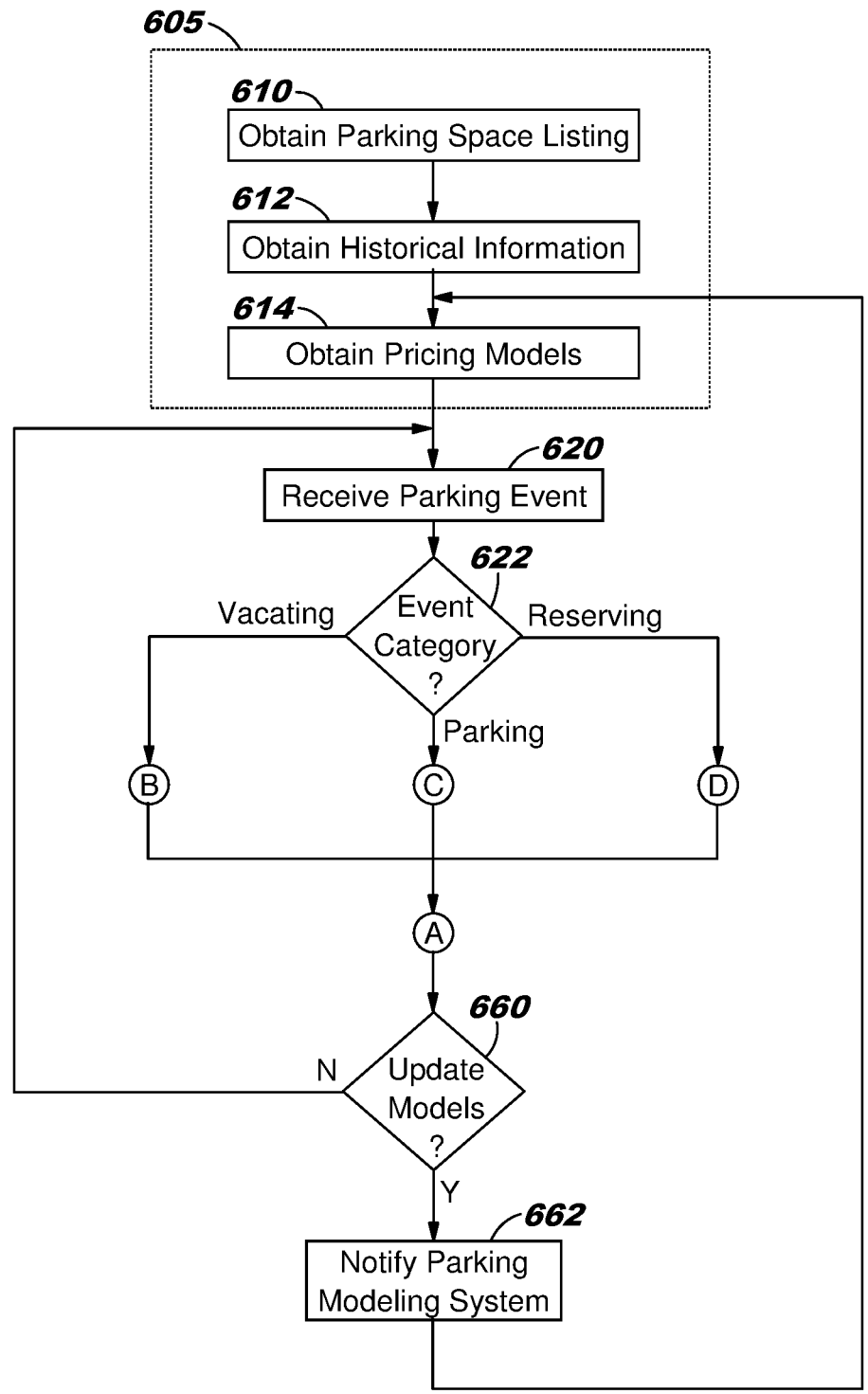

The parking pricing system first obtains or derives needed information for dynamically pricing from a variety of sources in steps 610-614 as indicated by dashed box 605 of FIG. 6A. If the parking pricing system is running continuously, then steps 610-614 may only need to be performed upon initial start-up of the system or whenever the system is restarted due to maintenance or other reasons. Step 610 includes obtaining a listing of all parking spaces or groups of parking spaces (e.g., a parking lot with access managed by a parking lot control device) including current usage and upcoming reservations from parking space database 414. These parking spaces may have been previously grouped into zones and subzones or other sector. In a second step 612, historic information regarding parking utilization is obtained from historical database 424. In a third step 614, the current pricing models are obtained from the pricing database 422. Other information useful for pricing parking may also be obtained at this time. Processing then proceeds to step 620.

In step 620, a parking event is received. The event may be a vehicle vacating a parking space (which may be an individual parking space or one of multiple parking spaces within a parking lot), a vehicle parking in a parking space, or a vehicle reserving a parking space. In step 622, the event is categorized based on the event type. As shown, if the event is a vehicle vacating a parking space (which may be detected by use of a video camera, an electric eye, the vehicle user indicating that the vehicle is leaving for paying the parking fee, etc.), then processing continues to step 630 of FIG. 6B as indicated by reference B. If the event is a vehicle parking in a parking space, then processing continues to step 640 of FIG. 6C as indicated by reference C. If the event is a user reserving a parking space, the processing continues to step 650 of FIG. 6D as indicated by reference D.

Figure 6B:
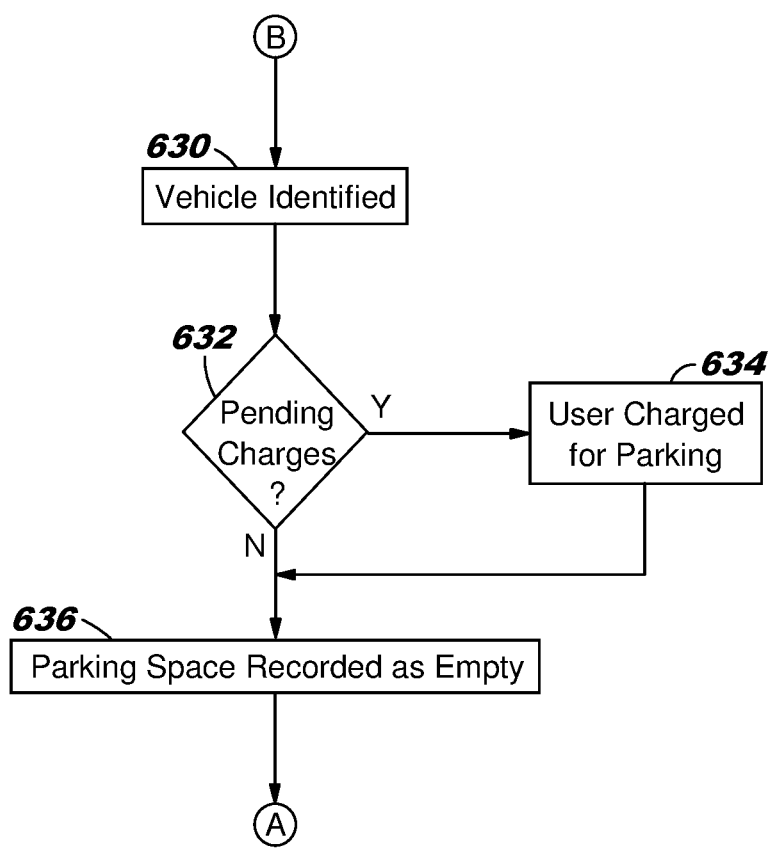

In step 630 of FIG. 6B, which occurs if a vehicle is vacating a parking space, the vehicle vacating the parking space is identified including any pending charges. For example, vehicle XYZ belonging to user ABC may have been parked in the parking space. This could be confirmed with a video camera, RFID reader of a RFID parking sticker in the vehicle, etc. Then in step 632, it is determined whether there are any pending charges (the user may have prepaid the parking fee or the parking space may have been free during the time the vehicle was parked there). If yes, then the user is charged for the time parking in the parking space in step 634. This can accomplished by charging the parking fee for the time parked against a prepaid account by the user, charging the parking fee against a credit or debit card of the user, charged against a mobile device payment account as the user places his or her mobile phone against a charge pad on the parking meter or other parking control device, or other similar method. The charges will take into account and incentives such as local business incentives for parking in this area. The local business may have separately verified the user visiting that business through the business user interface. The charging rate and the charging information of a user may be stored in parking user database 416, although that may be lowered if current parking prices are less. That is, a user may not be charged more for making a reservation if the administrative user implements a rule to that effect. If no in step 632 or after step 634, then in step 636 the empty parking space is recorded as such in parking space database 414. This information can be utilized below in determining pricing for a specific vehicle based on current supply and demand. Processing then proceeds to step 660 of FIG. 6A as indicated by reference A.

Figure 6C:
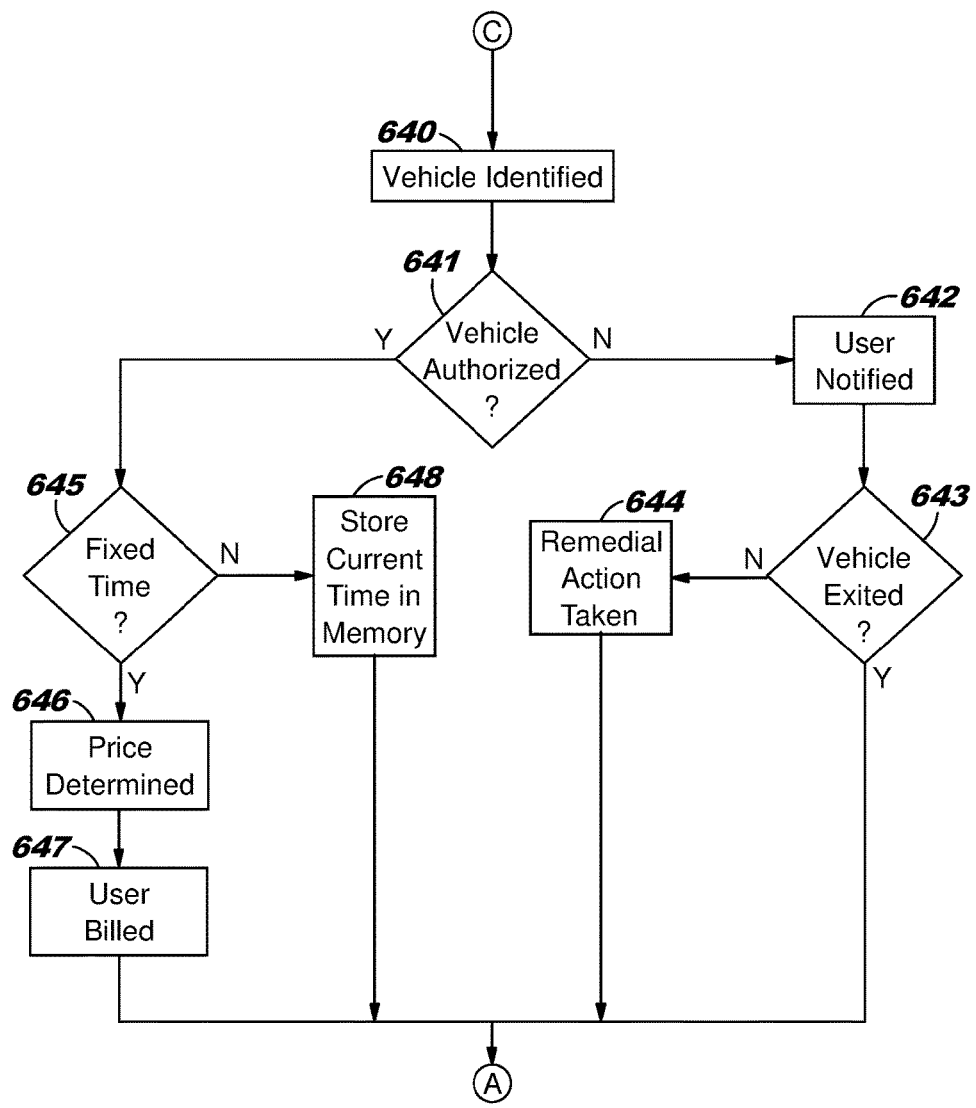

In step 640 of FIG. 6C, which occurs if a vehicle is parking in a parking space, that vehicle is identified. The user of the vehicle is also identified where possible. This can be through a video camera feed, a wireless connection between the vehicle and the parking control device, the user entering information in a mobile device, or other types of observation and/or communication. Then in step 641, it is determined whether the vehicle or a user associated with the vehicle is authorized to park in the parking space or lot. If not authorized, then processing continues to step 642, otherwise processing continues to step 645. For example, if the vehicle is not identified in step 640 and a certain vehicle is expected for this parking space, then the vehicle is not authorized in step 641. For another example, if the vehicle is identified and is not authorized for this parking space, then the vehicle is not authorized in step 641.

In either case or other cases where the vehicle is not authorized, then in step 642, the vehicle user is notified that he or she is not authorized to park in this parking space or lot. This notification can be by a displayed message on the parking control device, wirelessly to the vehicle for display on a vehicle user interface, wirelessly to the user such as through the user's mobile device, or other types of communication. Then it is determined whether the vehicle has exited the parking space or lot in step 643. If yes, then processing continues to step 660 of FIG. 6A as indicated by reference A, otherwise processing continues to step 644. In step 644, the vehicle has not vacated the parking space or lot, so a remedial action is taken in accordance with administrative preferences. This can include a monetary or other penalty charged to the user if the user is identified, a parking attendant or other official person may be notified to write and attach a parking ticket to the vehicle, a tow truck may summoned to remove the vehicle, or other action can be taken in accordance with administrative preferences. Processing would then continue to step 660 of FIG. 6A as indicated by reference A.

In step 645, it is determined whether the vehicle is being parked for a fixed period of time or an indeterminate period of time. A fixed period of time may be indicated by the use of a reservation by the vehicle user, by the user providing a fixed period of time through a parking control device interface, by the user indicating such through a mobile phone application, etc. If a fixed period of time, then processing continues to step 646, otherwise processing continues to step 648.

In step 646, the price of parking for the fixed period of time is determined. If the parking space was reserved by the vehicle user with a set parking price earlier, then that price will be utilized. However, if there was no parking reservation or if no set parking price was determined when making a reservation, then the parking price for this parking space is based on current supply and demand. That is, this parking space is located in a zone, subzone or other sector that is assigned a parking supply and demand pricing model generated by the parking modeling system. Given current supply and demand (e.g., parking utilization) for parking spaces in this parking zone and subzone, a price is determined utilizing the model set forth by the parking modeling system as described above.

Then in step 647, the user can be billed for the parking at this time. Payment can be performed by the user providing a charge card or even cash to the parking control device. Payment can also be performed through a mobile phone application, or the amount may be deducted from a user account. Alternative embodiments may utilize other forms of payment or even wait until the vehicle vacates the parking space to obtain payment from the user. Processing then continues to step 660 of FIG. 6A as indicated by reference A.

In step 648, which is performed when the user's vehicle is parked in the parking space for an indeterminate amount of time, the current time is stored in memory for later billing with any identification of the vehicle and user. A set rate (price per time period) for parking may be determined at this time for use when the vehicle vacates the parking space. This rate will be determined using the applicable parking supply and demand pricing model as described in step 646. Processing then continues to step 660 of FIG. 6A as indicated by reference A.

Step 650 of FIG. 6D occurs when a user is reserving a parking space in a parking space or lot. This can occur days or weeks ahead of parking the vehicle, or just minutes before parking. In step 650, it is determined whether the user has an account or has otherwise preregistered with the parking system. If yes, then in step 651 relevant information is obtained from the parking user database 416 and processing continues to step 653. If no, then in step 652, the user is required to register with the parking system including user preferences. Processing continues to step 653.

In step 653, the user is required to identify the vehicle to be parked and to provide an expected time of arrival, an expected duration of parking, and a general location where the user would like to park that vehicle. This can be a specific location (such as a business location) with a predetermined radius that the user has provided with his or her preferences. This can also be a zone, subzone, or other sector. Alternative embodiments may utilize alternative methods to indicate a parking location (e.g., at a dry cleaner on a route to home from my current location) which may be derived from a variety of sources, such as from user data provided to a vehicle's GPS device.

In step 654, the price of parking for the expected arrival time, expected duration, and general location is determined by the parking pricing system 445. That is, the parking spaces located in the general location provided were assigned a parking supply and demand pricing model generated by the parking modeling system. This model would need to be for the expected arrival time of the reservation. For example, the supply and demand model may have a time variable or utilize multiple models based on the expected arrival time. If no current supply and demand model is available for the expected arrival time and general location provided, then one may be generated by the parking modeling system or preset prices may be utilized. Given currently reserved supply and demand (e.g., parking utilization) for parking spaces in this parking zone and subzone or other sector, a price is determined utilizing the model set forth by the parking modeling system as described above. In an alternative embodiment, a user's sensitivity to parking pricing may be considered. For example, some users are price sensitive and willing to change parking locations for a small price advantage (i.e., their personal supply demand curve is elastic) whereas other users are not price sensitive and not willing to change parking locations for larger price advantages (i.e., their personal demand curve is inelastic). As a result, those users that are price sensitive may be moved to another parking space location in another sector with less of a discount compared to those users that are not price sensitive. The system can take advantage of this by providing lower discounts to the price sensitive users, thereby accomplishing similar translocation improvements with a smaller impact to overall revenue. For price insensitive users, the system may simply not show empty parking spaces in sectors that need a reduction in parking space utilization. This can be accomplished utilizing a secondary filter to the parking space database. Such personal differences may be derived from the historic database and stored as personal attributes in the parking user database. Then in step 655, any applicable discounts or other incentives available in the general location provided are identified from the databases. As an alternative embodiment, the parking space may be put up for bidding, particularly where the parking space or general area is in an area of high demand. An administrative user can provide the conditions where bidding may occur through rules and criteria.

Then in step 656, the general location and surrounding parking spaces are displayed on a map for the user with prices, including any applicable discounts or other incentives. The user can select a parking space to view details of any applicable incentives that are indicated. The user can also zoom, shrink, or pan the map. The user can also select a parking space to reserve. An example of this is shown in FIG. 8 below. In step 657, the system receives the selected parking space from the user and in step 658 stores a reservation for the parking space at the expected arrival time and for the expected duration. The user is then provided confirmation of the reservation in step 659. This can include providing asset of directions from the user's current location to the parking space. The directions may be based on preferred directions as indicated by the traffic management system. That is, the user may be provided directions that reduce overall traffic as indicated in traffic feed by the traffic management system. Processing then proceeds to step 660 of FIG. 6A as indicated by reference A.

In step 660 of FIG. 6A, it is determined whether the parking supply and demand models need to be updated. This could be due to a recent traffic event identified by the traffic management system, an unexpected surge in demand, or other factors which can be set forth by an administrator. For example, if planned utilization of a given zone, subzone or other sector is greater or less than certain predetermined thresholds (e.g., under planned utilization by 30%), then the pricing model may need to be modified. If no such updated is needed, then processing returns to step 620 to await the next parking event. If an update is needed, then the parking modeling system is notified in step 662 to initiate updating all or selected parking models, then processing returns to step 614 to obtain the updated models.

FIGS. 7A-F are a flow diagram of a parking pricing system in accordance with a second embodiment. This system works dynamically on an incremental/on-demand basis managing the allocation of and prices for parking spaces by utilizing the parking supply and demand pricing models generated by the parking management system. This system can also invoke the parking management system as needed to adjust or update the parking pricing models as needed. Furthermore, offers can be made to vehicle users or business users to optimize parking utilization.

Figure 7A:
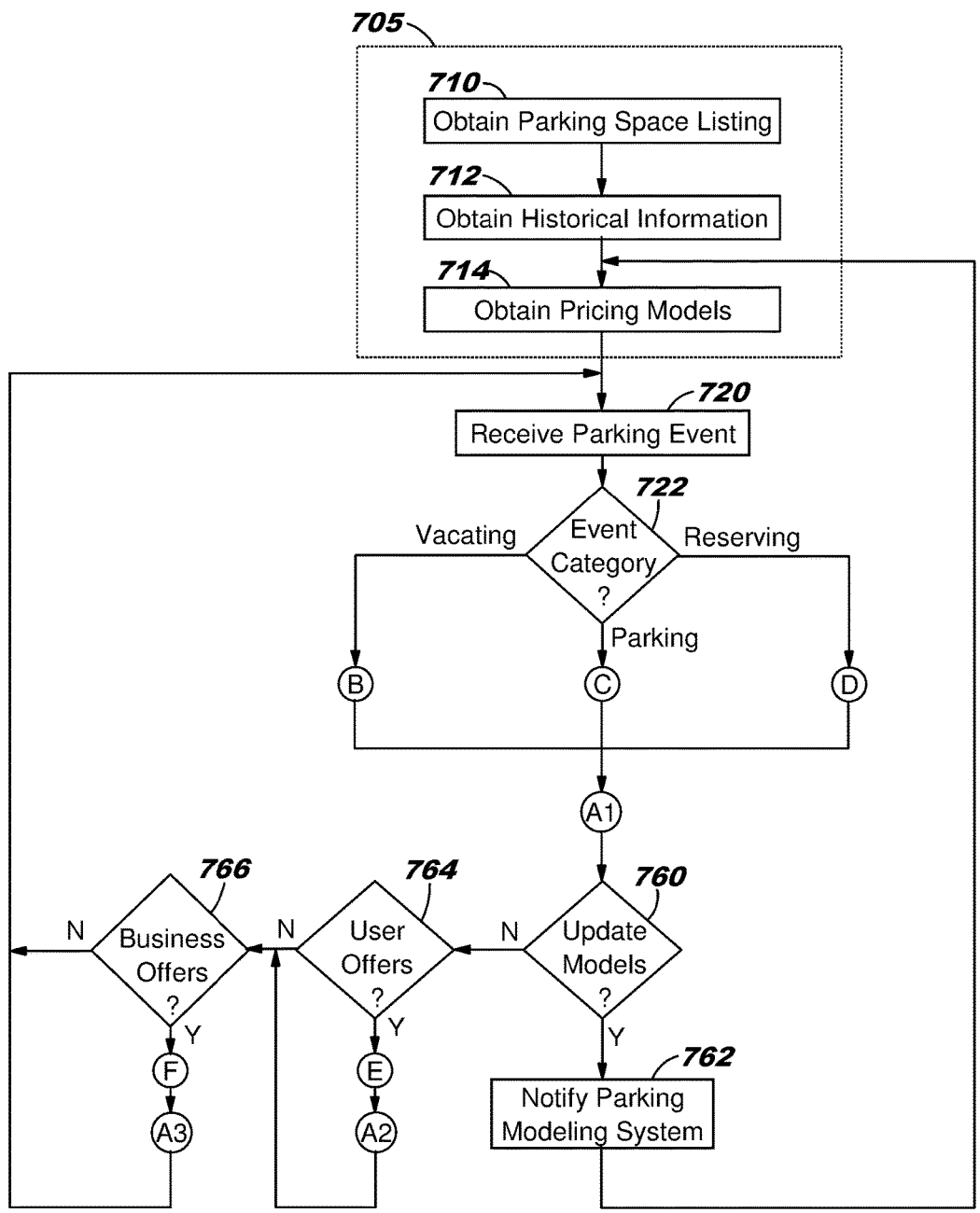

The parking pricing system first obtains or derives needed information for dynamically pricing from a variety of sources in steps 710-714 as indicated by dashed box 705 of FIG. 7A. If the parking pricing system is running continuously, then steps 710-714 may only need to be performed upon initial start-up of the system or whenever the system is restarted due to maintenance or other reasons. Step 710 includes obtaining a listing of all parking spaces or groups of parking spaces (e.g., a parking lot with access managed by a parking lot control device) including current usage and upcoming reservations from parking space database 414. These parking spaces may have been previously grouped into zones and subzones or other sector. In a second step 712, historical information regarding parking utilization is obtained from historic database 424. In a third step 714, the current pricing models are obtained from the pricing database 422. Other information useful for pricing parking may also be obtained at this time. Processing then proceeds to step 720.

In step 720, a parking event is received. The event may be a vehicle vacating a parking space (which may be an individual parking space or one of multiple parking spaces within a parking lot), a vehicle parking in a parking space, or a vehicle reserving a parking space. In step 722, the event is categorized based on the event type. As shown, if the event is a vehicle vacating a parking space (which may be detected by use of a video camera, an electric eye, the vehicle user indicating that the vehicle is leaving for paying the parking fee, etc.), then processing continues to step 730 of FIG. 7B as indicated by reference B. If the event is a vehicle parking in a parking space, then processing continues to step 740 of FIG. 7C as indicated by reference C. If the event is a user reserving a parking space, the processing continues to step 750 of FIG. 7D as indicated by reference D.

Figure 7B:
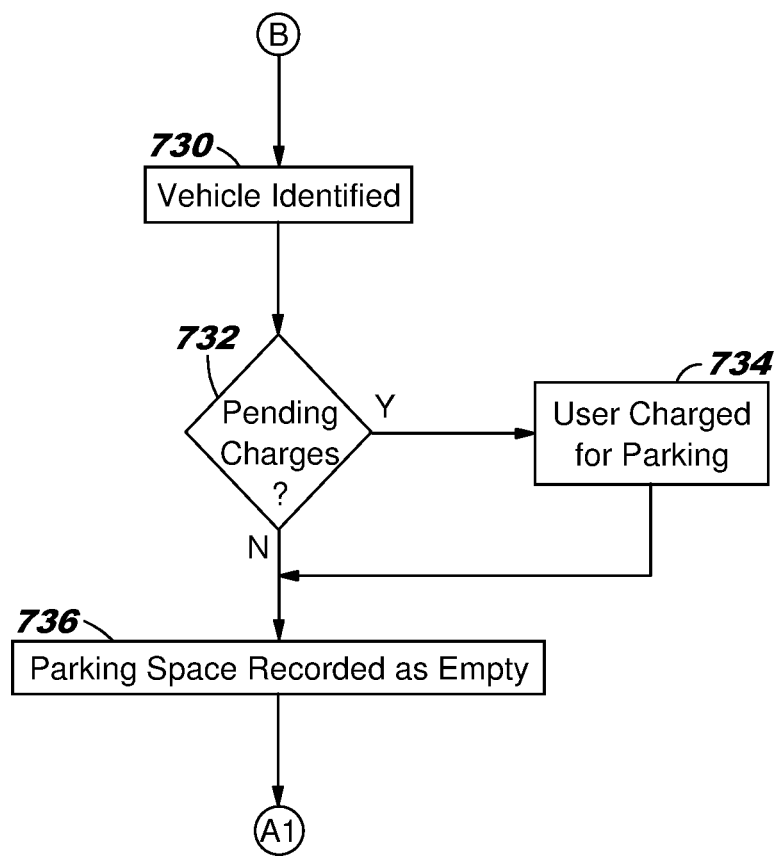

In step 730 of FIG. 7B, which occurs if a vehicle is vacating a parking space, the vehicle vacating the parking space is identified including any pending charges. For example, vehicle XYZ belonging to user ABC may have been parked in the parking space. This could be confirmed with a video camera, RFID reader of a RFID parking sticker in the vehicle, etc. Then in step 732, it is determined whether there are any pending charges (the user may have prepaid the parking fee or the parking space may have been free during the time the vehicle was parked there). If yes, then the user is charged for the time parking in the parking space in step 734. This can accomplished by charging the parking fee for the time parked against a prepaid account by the user, charging the parking fee against a credit or debit card of the user, charged against a mobile device payment account as the user places his or her mobile phone against a charge pad on the parking meter or other parking control device, or other similar method. The charges will take into account and incentives such as local business incentives for parking in this area. The local business may have separately verified the user visiting that business through the business user interface. The charging rate and the charging information of a user may be stored in parking user database 416, although that may be lowered if current parking prices are less. That is, a user may not be charged more for making a reservation if the administrative user implements a rule to that effect. If no in step 732 or after step 734, then in step 736 the empty parking space is recorded as such in parking space database 414. This information can be utilized below in determining pricing for a specific vehicle based on current supply and demand. Processing then proceeds to step 760 of FIG. 7A as indicated by reference A1.

Figure 7C:
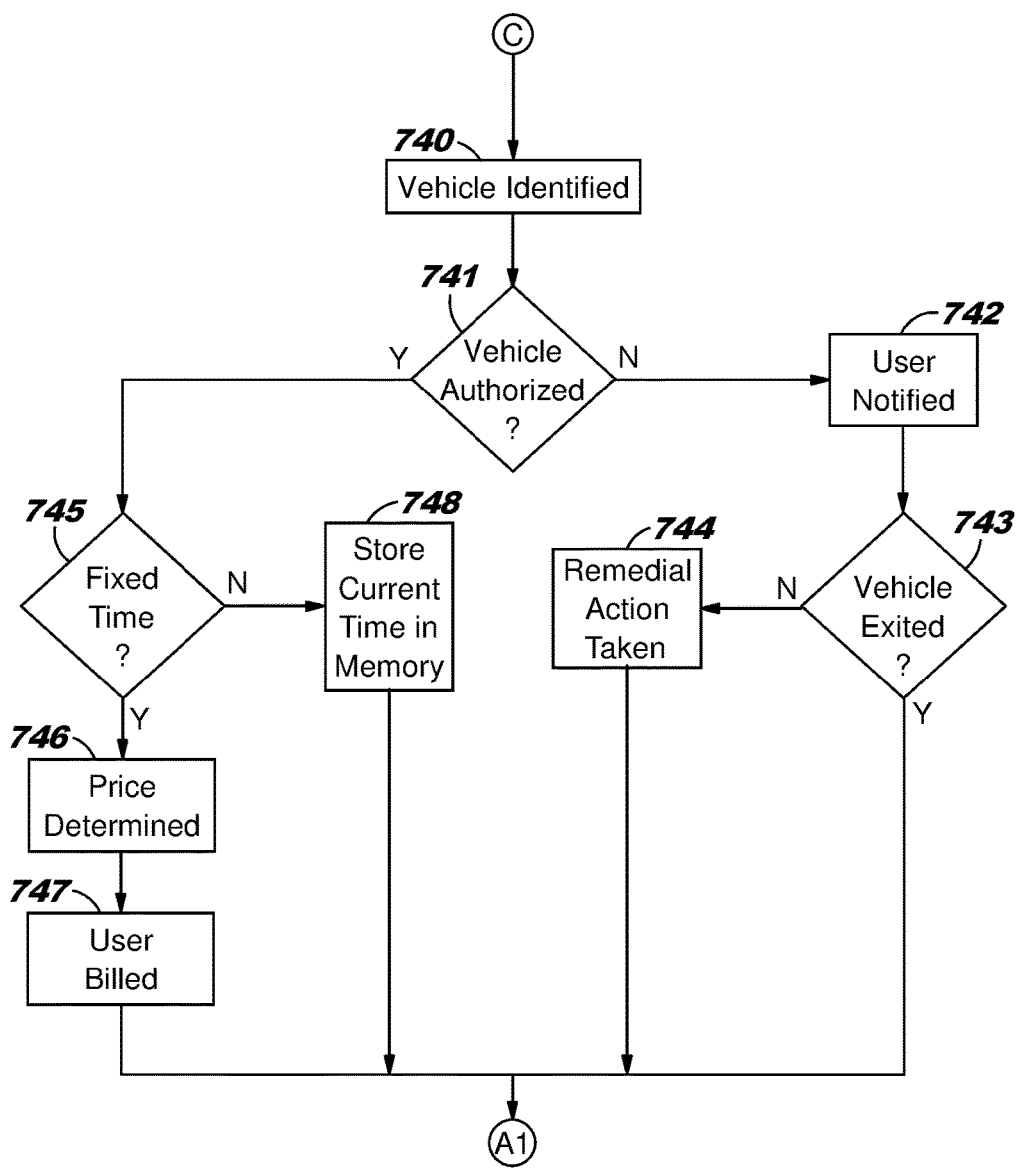

In step 740 of FIG. 7C, which occurs if a vehicle is parking in a parking space, that vehicle is identified. The user of the vehicle is also identified where possible. This can be through a video camera feed, a wireless connection between the vehicle and the parking control device, the user entering information in a mobile device, or other types of observation and/or communication. Then in step 741, it is determined whether the vehicle or a user associated with the vehicle is authorized to park in the parking space or lot. If not authorized, then processing continues to step 742, otherwise processing continues to step 745. For example, if the vehicle is not identified in step 740 and a certain vehicle is expected for this parking space, then the vehicle is not authorized in step 741. For another example, if the vehicle is identified and is not authorized for this parking space, then the vehicle is not authorized in step 741.

In either case or other cases where the vehicle is not authorized, then in step 742, the vehicle user is notified that he or she is not authorized to park in this parking space or lot. This notification can be by a displayed message on the parking control device, wirelessly to the vehicle for display on a vehicle user interface, wirelessly to the user such as through the user's mobile device, or other types of communication. Then it is determined whether the vehicle has exited the parking space or lot in step 743. If yes, then processing continues to step 760 of FIG. 7A as indicated by reference A1, otherwise processing continues to step 744. In step 744, the vehicle has not vacated the parking space or lot, so a remedial action is taken in accordance with administrative preferences. This can include a monetary or other penalty charged to the user if the user is identified, a parking attendant or other official person may be notified to write and attach a parking ticket to the vehicle, a tow truck may summoned to remove the vehicle, or other action can be taken in accordance with administrative preferences. Processing would then continue to step 760 of FIG. 7A as indicated by reference A1.

In step 745, it is determined whether the vehicle is being parked for a fixed period of time or an indeterminate period of time. A fixed period of time may be indicated by the use of a reservation by the vehicle user, by the user providing a fixed period of time through a parking control device interface, by the user indicating such through a mobile phone application, etc. If a fixed period of time, then processing continues to step 746, otherwise processing continues to step 748.

In step 746, the price of parking for the fixed period of time is determined. If the parking space was reserved by the vehicle user with a set parking price earlier, then that price will be utilized. However, if there was no parking reservation or if no set parking price was determined when making a reservation, then the parking price for this parking space is based on current supply and demand. That is, this parking space is located in a zone, subzone or other sector that is assigned a parking supply and demand pricing model generated by the parking modeling system. Given current supply and demand (e.g., parking utilization) for parking spaces in this parking zone and subzone, a price is determined utilizing the model set forth by the parking modeling system as described above.

Then in step 747, the user can be billed for the parking at this time. Payment can be performed by the user providing a charge card or even cash to the parking control device. Payment can also be performed through a mobile phone application, or the amount may be deducted from a user account. Alternative embodiments may utilize other forms of payment or even wait until the vehicle vacates the parking space to obtain payment from the user. Processing then continues to step 760 of FIG. 7A as indicated by reference A1.

In step 748, which is performed when the user's vehicle is parked in the parking space for an indeterminate amount of time, the current time is stored in memory for later billing with any identification of the vehicle and user. A set rate (price per time period) for parking may be determined at this time for use when the vehicle vacates the parking space. This rate will be determined using the applicable parking supply and demand pricing model as described in step 746. Processing then continues to step 760 of FIG. 7A as indicated by reference A1.

Step 750 of FIG. 7D occurs when a user is reserving a parking space in a parking space or lot. This can occur days or weeks ahead of parking the vehicle, or just minutes before parking. In step 750, it is determined whether the user has an account or has otherwise preregistered with the parking system. If yes, then in step 751 relevant information is obtained from the parking user database and processing continues to step 753. If no, then in step 752, the user is required to register with the parking system including user preferences. Processing continues to step 753.

In step 753, the user is required to identify the vehicle to be parked and to provide an expected time of arrival, an expected duration of parking, and a general location where the user would like to park that vehicle. This can be a specific location (such as a business location) with a predetermined radius that the user has provided with his or her preferences. This can also be a zone, subzone, or other sector. Alternative embodiments may utilize alternative methods to indicate a parking location (e.g., at a dry cleaner on a route to home from my current location) which may be derived from a variety of sources, such as from user data provided to a vehicle's GPS device.

In step 754, the price of parking for the expected arrival time, expected duration, and general location is determined by the parking pricing system 445. That is, the parking spaces located in the general location provided were assigned a parking supply and demand pricing model generated by the parking modeling system. This model would need to be for the expected arrival time of the reservation. For example, the supply and demand model may have a time variable or utilize multiple models based on the expected arrival time. If no current supply and demand model is available for the expected arrival time and general location provided, then one may be generated by the parking modeling system or preset prices may be utilized. Given currently reserved supply and demand (e.g., parking utilization) for parking spaces in this parking zone and subzone or other sector, a price is determined utilizing the model set forth by the parking modeling system as described above. Then in step 755, any applicable discounts or other incentives available in the general location provided are identified from the databases. As an alternative embodiment, the parking space may be put up for bidding, particularly where the parking space or general area is in an area of high demand. An administrative user can provide the conditions where bidding may occur through rules and criteria.

Then in step 756, the general location and surrounding parking spaces are displayed on a map for the user with prices, including any applicable discounts or other incentives. The user can select a parking space to view details of any applicable incentives that are indicated. The user can also zoom, shrink, or pan the map. The user can also select a parking space to reserve. An example of this is shown in FIG. 8 below. In step 757, the system receives the selected parking space from the user and in step 758 stores a reservation for the parking space at the expected arrival time and for the expected duration. The user is then provided confirmation of the reservation in step 759. This can include providing asset of directions from the user's current location to the parking space. The directions may be based on preferred directions as indicated by the traffic management system. That is, the user may be provided directions that reduce overall traffic as indicated in traffic feed by the traffic management system. Processing then proceeds to step 760 of FIG. 7A as indicated by reference A1.

In step 760 of FIG. 7A, it is determined whether the parking supply and demand models need to be updated. This could be due to a recent traffic event identified by the traffic management system, an unexpected surge in demand, or other factors which can be set forth by an administrator. For example, if planned utilization of a given zone, subzone or other sector is greater or less than certain predetermined thresholds (e.g., under planned utilization by 30%), then the pricing model may need to be modified. If no such updated is needed, then processing continues to step 764. If an update is needed, then the parking modeling system is notified in step 762 to initiate updating all or selected parking models, then processing returns to step 714 to obtain the updated models.

In step 764, it is determined whether any offers should be made to vehicle users who have previously made reservations or are currently parked in parking spaces. For example, if planned utilization for any of the zones, subzones or other sectors (i.e., pricing models) is over or under a predetermined threshold for a given time period, while being within the threshold set forth in step 760, then users may be provided offers to modify their reserved parking locations. This can be particularly true if adjoining zones, subzones or other sectors have unbalanced utilization rates. That is, if one subzone is being underutilized while an adjoining subzone is being over utilized, then users may be requested to park in the adjoining subzone. In another example, there may be insufficient parking currently available for incoming vehicles seeking reservations. In such a case, users currently parked may be provided a discount if they leave shortly to provide additional parking spaces. These criteria for determining whether to provide offers to vehicle users can be set forth by an administrative user. If yes, offers should be made to selected vehicle users as described below. Then processing continues to step 770 of FIG. 7E as indicated by reference E, otherwise processing continues to step 766. Once processing completes in FIG. 7E as indicated by reference A2, then processing returns to step 766.

In step 766, it is determined whether any offers should be made to business users who have accounts with the parking system. For example, if parking utilization within a given subzone are underutilized and any parking spaces within that subzone that are subsidized by a business are heavily utilized, then the business may be encouraged to increase the number of parking spaces subsidized in order to encourage greater utilization of parking spaces for that subzone generally. Also, if parking utilization within a first subzone are over utilized and an adjoining subzone is underutilized, then businesses encouraging parking in the first subzone may be encouraged to subsidize parking spaces in the adjoining subzone through the use of incentives. These criteria for determining whether to provide incentive offers to selected businesses can be set forth by an administrative user. If yes, offers should be made to some business users. Then processing continues to step 780 of FIG. 7F as indicated by reference F, otherwise processing continues to step 720. Once processing completes in FIG. 7F, as indicated by reference A3, then processing returns to step 720.

Figure 7E:
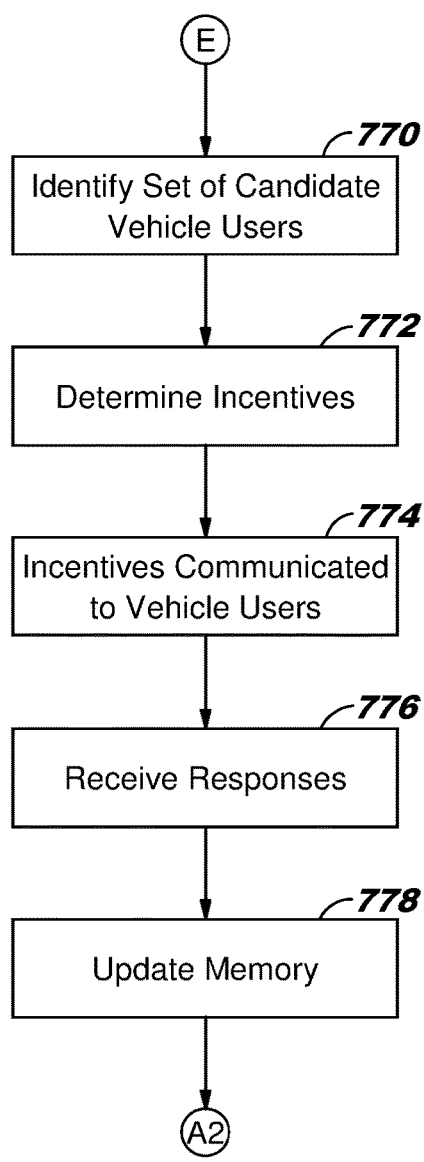
Figure 7F:
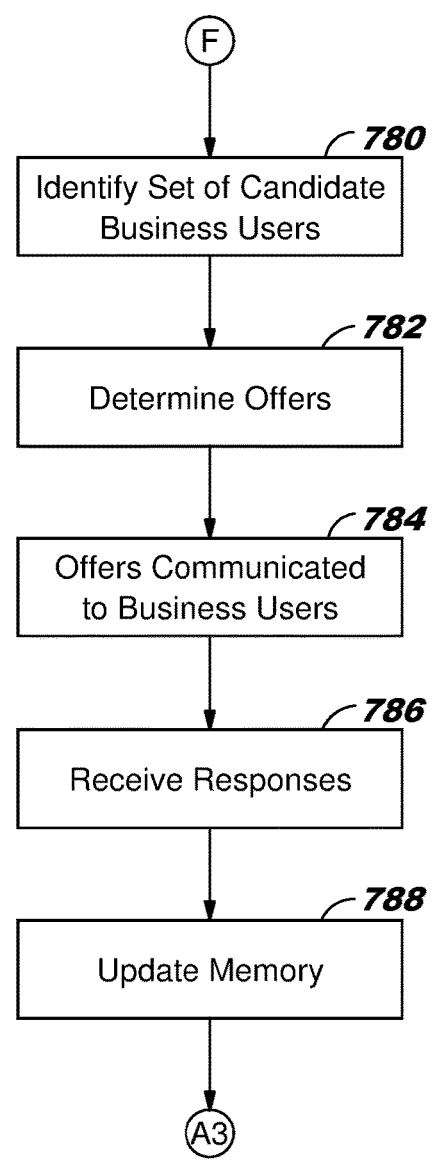

In step 770 of FIG. 7E, a set of candidate vehicle users with reservations or currently parked in desired zones, subzones or other sectors suitable for providing an offer are identified according to criteria set forth by the administrator. That is, vehicle users with reservations for parking spaces in a heavily utilized parking subzone may be encouraged to park in other less utilized parking subzone or vehicle users currently parked in a heavily utilized parking subzone may be encouraged to vacate their parking space shortly. Alternative embodiments may utilize alternative types of offers to vehicle users than described herein, including offers to vehicle users that do not have current reservations.

Then in step 772, the type and amount of incentive for each candidate vehicle user is determined in accordance with rules and criteria set forth by an administrative user. This can be a monetary or a non-monetary incentive. If monetary, the amount can be determined on a cost benefit basis according to criteria identified by an administrative user. For example, reducing parking in a specific area in anticipation of an event may have a significant value if parking for that event is charged at a higher rate. The vehicle user may also appreciate not being parked in an area with a major event, which could delay the vehicle user leaving the parking area. Non-monetary incentives such as points or other incentive may be considered. Other non-monetary benefits may also be considered in determining monetary or non-monetary incentives such as goodwill and traffic flow.

Then in step 774, each of the vehicle users is contacted and provided an offer as determined above to modify their parking reservation or vacate their parking space shortly, which can be a cancellation or a modification of the reservation. Subsequently in step 776, positive and negative responses are received from the vehicle users. A non-response is treated as a negative response in this embodiment. Then in step 778, the reservations of the vehicle users with positive responses are modified or otherwise updated accordingly and the offered incentive is stored in memory for implementation when the vehicle user parks in the newly reserved parking space. For vehicle users currently parked, a discount or other offered incentive is then stored in memory for use if the vehicle user actually vacates the parking space by the agreed to time. Processing then returns to step 766 of FIG. 7A as indicated by reference number A2.

In step 780 of FIG. 7E, a set of candidate business users with accounts for providing offers in desired zones, subzones or other sectors are identified according to criteria set forth by the administrator. That is, a business user is not required to have current incentives in place to receive an offer. These businesses may need to be within a predetermined distance from identified parking spaces needing increased or decreased parking utilization. The business users can increase parking utilization through incentives for those parking spaces or decrease parking utilization through incentives in other nearby parking spaces. This predetermined distance may be set forth by the administrative user or each individual business user.

Then in step 782, the type and amount of incentive for each candidate business user is determined in accordance with rules and criteria set forth by an administrative user. The type of offer can depend on the type of incentive the business offers to vehicle users. For example, if a business user offers discounts on parking for customers, then those discounts could be extended to additional parking spaces or different parking spaces with the approval of the business user. The extended discounts could be provided at the cost or at a reduced cost by the municipality or other parking system owner. Of course, if the business user has limited service capabilities (e.g., a restaurant), then the business user may decline the offer. The offer to business users can be a monetary or non-monetary offer. If monetary, the amount can be determined on a cost benefit basis according to factors identified by an administrative user. If non-monetary, a business may be provided a capability to advertise to vehicle users with current or future reservations in the general area of the business such as through a pop-up box when the user is making a reservation. Other non-monetary benefits may also be considered in determining monetary or non-monetary incentives such as goodwill and traffic flow.

Then in step 784, each of the business users is contacted and provided an offer as determined above to modify their parking incentives, which can be a new incentive or a modification of a current incentive. Subsequently in step 786, positive and negative responses are received from the business users. A non-response is treated as a negative response in this embodiment. Then in step 788, the incentives of the business users with positive responses are modified or otherwise updated accordingly in memory and the modification is stored in memory for use when a vehicle user initiates the process to reserve a parking space affected by the modified incentive. Processing then returns to step 720 of FIG. 7A as indicated by reference number A3.

Figure 8A:
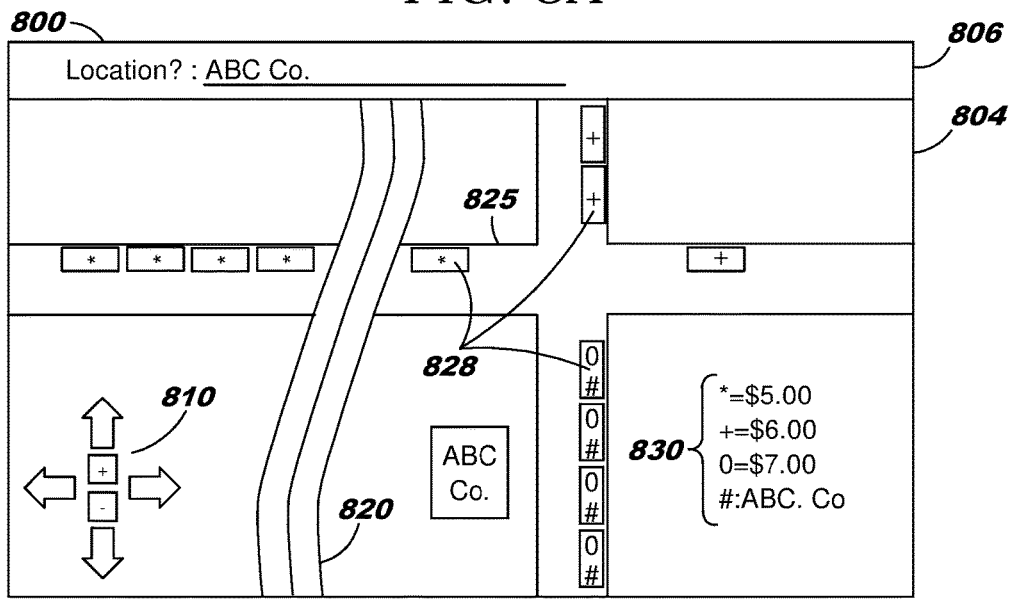
FIGS. 8A-B are pictorial diagrams of a vehicle user interface in which various embodiments may be implemented.
Figure 8B:
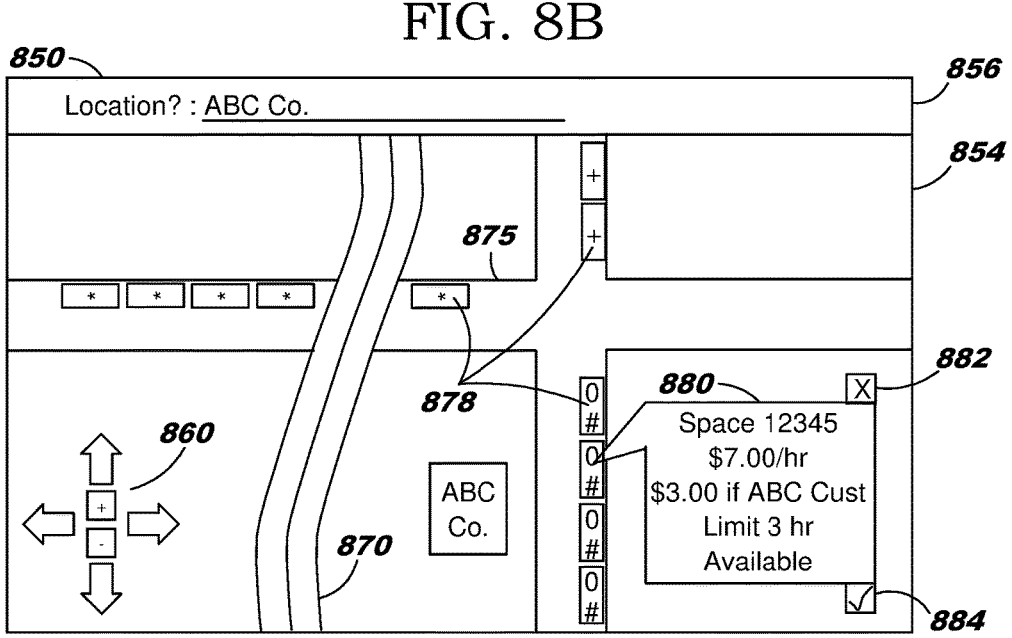

FIGS. 8A-B are pictorial diagrams of a vehicle user interface in which various embodiments may be implemented. FIG. 8A illustrates a map of an area with parking spaces identified and FIG. 8B illustrates a map of the same area with additional information in response to user input.

FIG. 8A illustrates a user display 800 with a map 804 and a user text input area 806 which a vehicle user may utilize to make a parking space reservation. Map 804 includes user navigation elements 810 including arrows for scrolling the map in four directions and zoom and shrink buttons. A user can select these elements with a user device such as a mouse or by touching the display if that display is touch sensitive. The map includes an area around a business identified by the user as ABC Co. in the text field. Alternatively, the user may provide an address or other information to select and area for display. This information may be provided by the user through a user device such as a keyboard, verbally, or through other known techniques for providing information.

Map 804 is roughly bisected with a highway 820 and cross streets 825. As a result, a set of zones, subzones or other sectors may be included in the displayed map. Parking spaces 828 are identified, each with indicators such as an asterisk and a pound sign, to indicate that they are in separate subzones or have different prices. Alternative indicators may be utilized such as colors, flashing, or other methods of indicating differences. A legend 830 is provided describing these indicators and their parking prices. As can be seen in the legend, some parking spaces are $5 per hour, some are $6 per hour and some are $7 per hour. As can also be seen, some of the parking spaces have incentives supported by ABC Co. A user can then select a parking space with a mouse, by touch, by voice command, or other known techniques for indicating a user selection. The result of this selection is shown in FIG. 8B.

FIG. 8B illustrates an updated user display 850 with a map 854 and a user text input area 856. This map is updated based on the user selecting a parking space as described above. As with FIG. 8A, map 854 includes user navigation elements 860 including arrows for scrolling the map in four directions and zoom and shrink buttons. A user can select these elements with a user device such as a mouse or by touching the display if that display is touch sensitive. The map includes the area around a business identified by the user as ABC Co. in the text field. Alternatively, the user may provide a new address or other information to select a different area for display. This information may be provided by the user through a user device such as a keyboard, verbally, or through other known techniques for providing information. As with FIG. 8A, map 854 is roughly bisected with a highway 870 and cross streets 875. As a result, the same set of zones, subzones or other sectors are included in the displayed map. Parking spaces 878 are identified, each with indicators such as an asterisk and a pound sign.

A pop-up box 880 is provided in response to a user clicking, touching or otherwise indicating a specific parking spot. Other alternatives can include a separate area on the display for providing the text, a verbal description which the user can hear, or other method for communicating information about the indicated parking space. In this example, pop-up box 880 includes a delete or close box 882 which the user can click or otherwise select to close the pop-up box. Pop-up box also includes a check box 884 for the user to select that parking space for reservation. If the user selects check box 884, then the system can request specific information regarding the reservation such as exact time for arriving and leaving, which user vehicle may be utilized, etc. Many other alternative embodiments may be utilized including a bidding system with spot prices displayed for parking in specific areas.

FIG. 9 is a pictorial diagram of a business user interface in which various embodiments may be implemented. FIG. 9 illustrates business user display 900 with a map 902 and a user text input area 904 which a vehicle user may utilize to make a parking space reservation. Also included is an incentive selection area 906. Map 902 includes user navigation elements 910 including arrows for scrolling the map in four directions and zoom and shrink buttons. A user can select these elements with a user device such as a mouse or by touching the display if that display is touch sensitive. The map includes an area around a business identified by the user at 3110 5th Avenue in the text field, which is the address of XYC Corp. in this example. Alternatively, the user may provide a business name or other information to select and area for display. This information may be provided by the user through a user device such as a keyboard, verbally, or through other known techniques for providing information.

Map 902 illustrates an area selected by the business user through text area 904. This area includes multiple local streets 920 with a variety of parking spaces 925 illustrated. Typically the parking spaces should be near the location of the business (XYZ Corp. in this example), although other locations may be chosen for advertising or goodwill purposes.

The business user can then select parking spaces to apply and incentive using a mouse, touch, or other method of indicating a selection. The user can then provide the incentive in incentive selection area 906. In this example, the business user selected 11 parking spaces as indicated by check marks and chose a 10% sales discount for any vehicle user parking in those parking spaces. Alternatively, the business user could have selected a parking subsidy or other types of incentives. If the business user selected other, then a large set of incentives may have been displayed or the business user may be contacted by an administrative user to manually program in an incentive. Many other alternative embodiments may be utilized including allowing the business user to select applicable parking spaces and implement parking incentives for those parking spaces.

FIG. 10 is a pictorial diagram of an administrator user interface in which various embodiments may be implemented. In this embodiment, an administrative user can select rules and criteria for implementing dynamic parking utilization management through supply and demand models implemented using rules and criteria. Criteria based rules are rules or actions to be taken if certain conditions are met. An example of this is provided below.

Administrative user interface 1000 includes four main areas for implementing criteria based rules. Box 1010 includes the location where rules are implemented, box 1020 includes the time the rules are implemented, box 1030 includes certain preselected rules, and box 1040 includes a free form method for an administrative user to implemented rules and criteria. Box 1010 includes a variety of standard locations which can be specified. For example, certain zones, subzones, parking spaces and parking space types may be specified for implementing a criterion based rule. A parking space type may be a disabled parking zone, a parallel parking space, or other type of parking space. In this example, a rule will be implemented for zones A and B. Box 1020 includes a variety of standard times which can be specified. For example, a rule can be implemented at all times (24/7/365), at all times except for certain dates, daily from 8 am to 5 pm, during rush hours, at certain hours every day, or during specified days and hours. Other alternative standard times could be specified for selection by a user. In this example, rush hours are selected. The location and time of implementing a rule can be considered as criteria or as part of the rule.

Box 1030 provides certain rules which the user can select. For example, the user can set a minimum fee, a maximum fee or an average utilization rate. The user can also specify another type of rule such as a utilization range, etc. Other alternative standard rules could be specified for selection by the user. In this example, the average utilization rate is set equal to a variable Z, which is specified in box 1040. Box 1040 is a free form area for the administrative user to specify rules and criteria to supplement the above selection or as standalone rules and criteria. In this example, the rule is shown where the average utilization rate Z for zones A and B during rush hours is set inversely proportional to the traffic volume, where TRAFFIC_VOLUME is a variable known to the parking system. A criterion for implementing this rule is set to occur in this example only if TRAFFIC_VOLUME is greater than 60%. As a result, if there is a holiday or other slow day with low traffic volume where the rule is not needed, then the criterion prevents the rule from taking effect. Many other alternative embodiments may be utilized including allowing the administrative user to modify existing rules as they are being implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for dynamically managing parking space utilization. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for dynamically managing parking space utilization comprising:
   receiving a dynamic feed of available parking spaces across a set of sectors, each parking space associated with a parking control device, each sector having a preferred utilization rate;
   utilizing a processor to determine that a parking utilization rate of a first sector exceeds a preferred utilization rate for the first sector;
   providing to a user a list of available parking spaces including associated prices dynamically generated, wherein parking spaces in the first sector are priced higher than parking spaces in other sectors; and
   upon selection of one of the provided list of available parking spaces by the user, charging the selected parking space to the user at the provided associated price and notifying the parking control device associated with the selected parking space.

2. The method of claim 1 wherein the parking utilization rate of the first sector is a utilization of parking spaces in that sector.

3. The method of claim 2 wherein the preferred utilization rate for each sector is based on a traffic flow with that sector.

4. The method of claim 3 further comprising receiving a traffic feed from a traffic database; and modifying the associated prices based on the traffic feed.

5. The method of claim 4 further comprising dynamically generating a set of supply and demand based models using criterion based rules for pricing parking spaces to manage parking utilization rates in accordance with the preferred utilization rate for each sector.

6. The method of claim 5 further comprising receiving a parking incentive from a business user for a set of selected parking spaces; providing the parking incentives to the user in response to the parking space inquiry; notifying the parking space database of the parking incentive for the allocated parking space; determining whether a parking utilization rate for the first sector exceeds the preferred utilization rate for the first sector; and upon such a determination providing a discount offer to the user of an allocated parking space in the first sector maintaining a parking space database in computer memory of available parking spaces by time and location; wherein the reservation request includes a time period for parking; and wherein the parking space database is notified of the allocated parking space to the user.

7. The method of claim 2 further comprising maintaining a parking space database in computer memory of available parking spaces by time and location; and wherein the parking space database is notified of the allocated parking space to the user.

8. The method of claim 7 further comprising determining whether the parking utilization rate for the first sector exceeds the preferred utilization rate for the first sector; and upon such a determination providing a discount offer to the user of an allocated parking space in the first sector.

9. The method of claim 2 further comprising receiving a parking incentive from a business user for a set of selected parking spaces; providing the parking incentives to the user in response to a user inquiry; and notifying the parking space database of the parking incentive for the allocated parking space.

10. The method of claim 1 wherein the list of available parking spaces is provided to the user in response to a parking space request from a user.

11. The method of claim 10 wherein the parking space request from the user is received from a mobile device application.

12. The method of claim 11 wherein the list of available parking spaces is provided to the user through the mobile device application.

13. A computer implemented method (CIM) comprising:
dynamically determining a number of available parking spaces in an area and an identity of a first currently-available smart parking meter associated with each available parking space to obtain a dynamic availability feed;
responsive to each dynamic determination:
calculating, for the parking space associated with the first currently-available smart parking meter, a price based, at least in part, upon the number of available parking spaces,
transmitting the calculated price for the parking space associated with the first currently-available smart parking meter to the given currently-available smart parking meter and to a parking application; and
receiving, from a first driver and through the parking app, payment of the calculated price in exchange for a privilege of parking a vehicle in the parking space associated with the first currently-available smart parking meter.

14. The CIM of claim 13 wherein the calculation of the price is further based upon a parking administrator application.

15. The CIM of claim 13 wherein the calculation of the price is further based upon a business application in proximity of the parking space associated with the first currently-available smart parking meter.

16. The CIM of claim 13 wherein the calculation of the price is further based upon a dynamically updated traffic feed.

* * * * *